US012723111B2

(12) United States Patent
Hayakawa et al.

(10) Patent No.: US 12,723,111 B2
(45) Date of Patent: Sep. 1, 2026

(54) PALLADIUM CATALYSTS FOR FORMING VINYL ADDITION POLYMERS HAVING IMPROVED FILM FORMING PROPERTIES

(71) Applicants: PROMERUS, LLC, Akron, OH (US); SUMITOMO BAKELITE CO., LTD., Tokyo (JP)

(72) Inventors: Shun Hayakawa, Tokyo (JP); Hugh Burgoon, Akron, OH (US); J. Alex Niemiec, Akron, OH (US); Doug Skilskyj, Akron, OH (US); Larry F Rhodes, Akron, OH (US)

(73) Assignee: PROMERUS, LLC, Akron, OH (US)

( * ) Notice: Subject to any disclaimer, the term of this patent is extended or adjusted under 35 U.S.C. 154(b) by 687 days.

(21) Appl. No.: 18/130,979

(22) Filed: Apr. 5, 2023

(65) Prior Publication Data

US 2023/0312775 A1 Oct. 5, 2023

Related U.S. Application Data

(60) Provisional application No. 63/327,632, filed on Apr. 5, 2022.

(51) Int. Cl.

| | |
|---|---|
| ***C08F 4/80*** | (2006.01) |
| ***B01J 31/28*** | (2006.01) |
| ***C08F 32/00*** | (2006.01) |
| ***C08J 5/18*** | (2006.01) |
| *C07F 15/00* | (2006.01) |

(52) U.S. Cl.

CPC ................ *C08F 4/80* (2013.01); *C08F 32/00* (2013.01); *C08J 5/18* (2013.01); *B01J 31/28* (2013.01); *C07F 15/006* (2013.01); *C07F 15/0066* (2013.01); *C08J 2345/00* (2013.01)

(58) Field of Classification Search

CPC .... C08F 4/80; C08F 4/70; C08F 32/00; C08F 32/08

See application file for complete search history.

(56) References Cited

U.S. PATENT DOCUMENTS

| | | | | |
|---|---|---|---|---|
| 6,350,832 | B1 * | 2/2002 | Bell | C08F 232/08 526/171 |
| 6,455,650 | B1 * | 9/2002 | Lipian | C08F 32/08 526/284 |
| 6,903,171 | B2 * | 6/2005 | Rhodes | C08F 32/00 526/309 |
| 7,148,176 | B2 * | 12/2006 | Beller | C07F 15/045 502/166 |
| 7,759,439 | B2 * | 7/2010 | Rhodes | C08F 2/38 526/292.3 |
| 7,863,394 | B2 * | 1/2011 | Rhodes | C08F 232/00 526/292.9 |
| 10,981,157 | B2 * | 4/2021 | Carrow | B01J 31/2208 |
| 11,420,987 | B2 * | 8/2022 | Shi | C07C 213/02 |
| 11,667,731 | B2 * | 6/2023 | Hayakawa | C08F 32/04 526/90 |
| 2005/0187398 | A1 * | 8/2005 | Bell | C08F 32/00 556/136 |
| 2008/0125556 | A1 * | 5/2008 | Ohkita | C08F 230/085 526/145 |
| 2009/0297870 | A1 * | 12/2009 | Takeyama | C08J 5/18 524/80 |

FOREIGN PATENT DOCUMENTS

| | | |
|---|---|---|
| JP | 2008/231361 A | 10/2008 |
| JP | 2012-111872 A | 6/2012 |
| WO | WO 2005/042147 A2 | 5/2005 |

OTHER PUBLICATIONS

Thirupathi, N. et al., "Latent cationic palladium(II) phosphine carboxylate complexes for norbornene polymerization", Journal of polymer science part A: polymer chemistry, 2009, vol. 47, pp. 103-110.

Written Opinion of the ISA: PCT/US2023/017514, Jul. 17, 2023.

* cited by examiner

*Primary Examiner* — Rip A Lee
(74) *Attorney, Agent, or Firm* — Balaram Gupta

(57) ABSTRACT

A series of palladium compounds as described herein are found to be superior vinyl addition polymerization catalysts. Specifically the compounds of formulae (I) and (II) as described herein surprisingly exhibit much higher reactivity than the compounds known in the art in the vinyl addition polymerization of a variety of cyclo-olefinic monomers, and thus polymers of very high molecular weight can be formed. Also disclosed are the formation of a variety of solid three dimensional objects, such as for example, solution extrusion of the polymer solutions formed from the vinyl addition polymerization of a variety of cyclic-olefinic monomers utilizing very low levels of palladium compounds of formulae (I) or (II) as described herein. The polymer films formed from the polymerization composition exhibit hitherto unattainable properties, for example superior transparent properties, higher thermal and mechanical properties, among other improved properties. Accordingly, the films thus formed are useful in a variety of opto-electronic applications.

14 Claims, 3 Drawing Sheets

PALLADIUM CATALYSTS FOR FORMING VINYL ADDITION POLYMERS HAVING IMPROVED FILM FORMING PROPERTIES

CROSS REFERENCE TO RELATED APPLICATIONS

This application claims the benefit of U.S. Provisional Application No. 63/327,632, filed Apr. 5, 2022, which is incorporated herein by reference in its entirety.

BACKGROUND OF THE INVENTION

Field of the Invention

The present invention relates to a series of palladium compounds. More specifically, the present invention relates to a series of palladium compounds of formulae (I) and (II). This invention also relates to methods of making these compounds. The compounds of this invention are extremely reactive and are found to be excellent vinyl addition polymerization catalysts for forming high molecular weight poly cyclo-olefinic polymers having superior optical, thermal and mechanical properties. More particularly, the polymers thus formed in solution can be readily extruded into transparent films which are useful in a variety of opto-electronic applications.

Description of the Art

Cyclic olefin polymers, such as polynorbornenes (PNBs), are widely used in a variety of electronic, optoelectronic and other applications, and therefore, methods of making such PNBs in an industrial scale are gaining importance. It is well known in the literature that various functionalized PNBs can be synthesized by employing suitable starting norbornene monomers by vinyl addition polymerization using a variety of transition metal catalysts and procatalysts. See for example, U.S. Pat. No. 7,910,674 B2, pertinent portions of which are incorporated herein by reference.

The PNBs are generally used as a coating compositions in various applications as mentioned above. One possible way of using these materials is on the form of a film either by solution casting or extrusion of the PNBs in a suitable solvent. The films thus formed are expected to exhibit good optical and low dielectric properties as well as thermo-mechanical properties. However, use of excessive amounts of solvents in such operations pose problems in a large scale commercial operations. In addition, use of various transition metals in the vinyl addition polymerizations also poses problems as it is desirable to obtain substantially metal free polymer for many of the opto-electronic applications. It is also very difficult to remove the residual metals from the polymers. Also, there is a need to develop highly active catalysts so that lower amounts of the catalysts can be employed to produce PNBs of very high molecular weight.

PNBs made from a variety of palladium catalysts appear to provide better quality polymers and address some of the problems faced in the art. However, a variety of palladium catalysts used to form PNBs result in hazy polymeric films. In addition, some of these catalysts are not so active resulting in lower conversion (<90%) and require additional steps to purify the polymer in order to remove residual monomers and oligomers. See for example, U.S. Patent Application Pub. No. US 2005/0187398 A1, where a series of single component cationic palladium proinitiators have been reported. However, several of these proinitiators were either not as active and/or produced inferior quality polymer films.

Accordingly, it is an object of this invention to provide a highly active palladium catalysts to form very high molecular weight PNBs having excellent optical, thermal, mechanical and electrical properties.

It is also an object of this invention to provide a series of PNBs that are useful in a variety of opto-electronic applications.

It is further an object of this invention to provide high concentration PNB solutions for forming films having hitherto unattainable optical, thermal, mechanical and electrical properties.

Other objects and further scope of the applicability of the present invention will become apparent from the detailed description that follows.

SUMMARY OF THE INVENTION

Surprisingly, it has now been found that a variety of palladium compounds of formulae (I) and (II), as described herein, are highly active in vinyl addition polymerizations of a variety of norbornene type monomers of formula (IV), as described herein. The polynorbornenes formed using the palladium compounds formulae (I) or (II) exhibit very high molecular weights with narrow polydispersity. Thus, it is now possible to use lower amounts of palladium compounds of formulae (I) or (II) to form polynorbornenes of very high molecular weight. Further, the rate of conversion of monomers to polymer is very high ranging from 99.5 percent to 99.9 percent or higher, thus eliminating any concerns to remove any residual monomers or oligomers. Even more importantly it is important to note that high conversions of up to 99 percent or higher can be achieved in less than 30 to 60 minutes. The polymers are readily soluble in a variety of solvents to form very high concentration clear polymer solutions, from ten (10) weight percent to fifty (50) weight percent solutions. The polymer solutions can then readily be cast into films using a variety of methods, including but not limited to solution casting and extrusion methods. The films thus formed exhibit improved optical, thermal, mechanical and electrical properties, thus having a variety of opto-electronic applications.

BRIEF DESCRIPTION OF THE DRAWINGS

Embodiments in accordance with the present invention are described below with reference to the following accompanying figures and/or images. Where drawings are provided, it will be drawings which are simplified portions of various embodiments of this invention and are provided for illustrative purposes only.

DETAILED DESCRIPTION OF THE INVENTION

Figure 1:
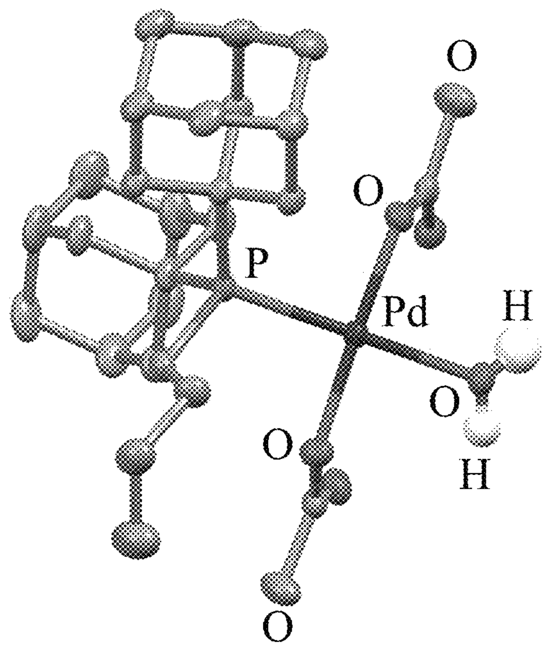
FIG. 1 shows a drawing of a molecular structure for palladium diacetate diadamantyl-(n-butyl)phosphine($H_2O$) (Pd601), an illustrative example of a palladium compound of formula (I) in accordance with this invention, also exemplified in Example 1.

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, the expression "alkyl" means a saturated, straight-chain or branched-chain hydrocarbon substituent having the specified number of carbon atoms. Particular alkyl groups are methyl, ethyl, n-propyl, isopropyl, tert-butyl, and so on. Derived expressions such as "alkoxy", "thioalkyl", "alkoxyalkyl", "hydroxyalkyl", "alkylcarbonyl", "alkoxycarbonylalkyl", "alkoxycarbonyl", "diphenylalkyl", "phenylalkyl", "phenylcarboxyalkyl" and "phenoxyalkyl" are to be construed accordingly.

As used herein, the expression "cycloalkyl" includes all of the known cyclic groups. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "perhaloalkyl" represents the alkyl, as defined above, wherein all of the hydrogen atoms in said alkyl group are replaced with halogen atoms selected from fluorine, chlorine, bromine or iodine. Illustrative examples include trifluoromethyl, trichloromethyl, tribromomethyl, triiodomethyl, pentafluoroethyl, pentachloroethyl, pentabromoethyl, pentaiodoethyl, and straight-chained or branched heptafluoropropyl, heptachloropropyl, heptabromopropyl, nonafluorobutyl, nonachlorobutyl, undecafluoropentyl, undecachloropentyl, tridecafluorohexyl, tridecachlorohexyl, and the like. Derived expression, "perhaloalkoxy", is to be construed accordingly. It should further be noted that certain of the alkyl groups as described herein, such as for example, "alkyl" may partially be fluorinated, that is, only portions of the hydrogen atoms in said alkyl group are replaced with fluorine atoms and shall be construed accordingly.

As used herein the expression "acyl" shall have the same meaning as "alkanoyl", which can also be represented structurally as "R—CO—," where R is an "alkyl" as defined herein having the specified number of carbon atoms. Additionally, "alkylcarbonyl" shall mean same as "acyl" as defined herein. Specifically, "$(C_1$-$C_4)$acyl" shall mean formyl, acetyl or ethanoyl, propanoyl, n-butanoyl, etc. Derived expressions such as "acyloxy" and "acyloxyalkyl" are to be construed accordingly.

As used herein, the expression "aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art.

As used herein, the expression "arylalkyl" means that the aryl as defined herein is further attached to alkyl as defined herein. Representative examples include benzyl, phenylethyl, 2-phenylpropyl, 1-naphthylmethyl, 2-naphthylmethyl and the like.

As used herein, the expression "alkenyl" means a non-cyclic, straight or branched hydrocarbon chain having the specified number of carbon atoms and containing at least one carbon-carbon double bond, and includes ethylidene, vinyl, ethenyl and straight-chained or branched propenyl, butenyl, pentenyl, hexenyl, and the like. Derived expression, "arylalkenyl" and five membered or six membered "heteroarylalkenyl" is to be construed accordingly. Illustrative examples of such derived expressions include 2-ethylidenebicyclo[2.2.1]heptane or 2-ethylidenenorbornane, 2-vinylnorbornane, phenylethenyl, 4-methoxyphenylethenyl, and the like.

As used herein, the expression "heteroaryl" includes all of the known heteroatom containing aromatic radicals. Representative 5-membered heteroaryl radicals include furanyl, thienyl or thiophenyl, pyrrolyl, isopyrrolyl, pyrazolyl, imidazolyl, oxazolyl, thiazolyl, isothiazolyl, and the like. Representative 6-membered heteroaryl radicals include pyridinyl, pyridazinyl, pyrimidinyl, pyrazinyl, triazinyl, and the like radicals. Representative examples of bicyclic heteroaryl radicals include, benzofuranyl, benzothiophenyl, indolyl, quinolinyl, isoquinolinyl, cinnolyl, benzimidazolyl, indazolyl, pyridofuranyl, pyridothienyl, and the like radicals.

As used herein, the expression "heterocycle" includes all of the known reduced heteroatom containing cyclic radicals. Representative 5-membered heterocycle radicals include tetrahydrofuranyl, tetrahydrothiophenyl, pyrrolidinyl, 2-thiazolinyl, tetrahydrothiazolyl, tetrahydrooxazolyl, and the like. Representative 6-membered heterocycle radicals include piperidinyl, piperazinyl, morpholinyl, thiomorpholinyl, and the like. Various other heterocycle radicals include, without limitation, aziridinyl, azepanyl, diazepanyl, diazabicyclo[2.2.1]hept-2-yl, and triazocanyl, and the like.

"Halogen" or "halo" means chloro, fluoro, bromo, and iodo.

In a broad sense, the term "substituted" is contemplated to include all permissible substituents of organic compounds. In a few of the specific embodiments as disclosed herein, the term "substituted" means substituted with one or more substituents independently selected from the group consisting of $(C_1$-$C_6)$alkyl, $(C_2$-$C_6)$alkenyl, $(C_1$-$C_6)$perfluoroalkyl, phenyl, hydroxy, —$CO_2H$, an ester, an amide, $(C_1$-$C_6)$ alkoxy, $(C_1$-$C_6)$thioalkyl and $(C_1$-$C_6)$perfluoroalkoxy. However, any of the other suitable substituents known to one skilled in the art can also be used in these embodiments.

It should be noted that any atom with unsatisfied valences in the text, schemes, examples and tables herein is assumed to have the appropriate number of hydrogen atom(s) to satisfy such valences.

It will be understood that the terms "dielectric" and "insulating" are used interchangeably herein. Thus reference to an insulating material or layer is inclusive of a dielectric material or layer and vice versa. Further, as used herein, the term "organic electronic device" will be understood to be inclusive of the term "organic semiconductor device" and the several specific implementations of such devices as is well known in the art.

As used herein, the dielectric constant (Dk) of a material is the ratio of the charge stored in an insulating material placed between two metallic plates to the charge that can be stored when the insulating material is replaced by vacuum or air. It is also called as electric permittivity or simply permittivity. And, at times referred as relative permittivity, because it is measured to relatively from the permittivity of free space.

As used herein, "low-loss" is the dissipation factor (Df), which is a measure of loss-rate of energy of a mode of oscillation (mechanical, electrical, or electromechanical) in a dissipative system. It is the reciprocal of quality factor, which represents the "quality" or durability of oscillation.

By the term "derived" is meant that the polymeric repeating units are polymerized (formed) from, for example, polycyclic norbornene-type monomers in accordance with formulae (I) wherein the resulting polymers are formed by 2,3 enchainment of norbornene-type monomers as shown below:

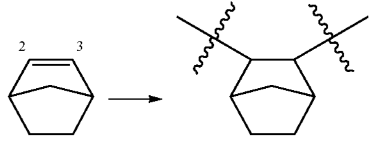

The above polymerization is also known widely as vinyl addition polymerization typically carried out in the presence of organometallic compounds such as palladium compounds or nickel compounds as further described in detail below.

Thus, in accordance with the practice of this invention there is provided a palladium compound selected from the group consisting of:

a compound of formula (I):

(I)

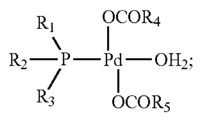

and a compound of formula (II):

(II)

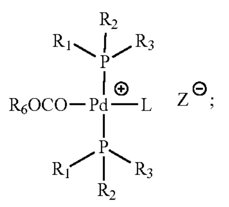

wherein

L is selected from the group consisting of acetonitrile, propionitrile, n-butyronitrile, tert-butyronitrile, benzonitrile ($C_6H_5CN$), 2,4,6-trimethylbenzonitrile, phenyl acetonitrile ($C_6H_5CH_2CN$), pyridine, 2-methylpyridine, 3-methylpyridine, 4-methylpyridine, 2,3-dimethylpyridine, 2,4-dimethylpyridine, 2,5-dimethylpyridine, 2,6-dimethylpyridine, 3,4-dimethylpyridine, 3,5-dimethylpyridine, 2,6-di-t-butylpyridine, 2,4-di-t-butylpyridine, 2-methoxypyridine, 3-methoxypyridine, 4-methoxypyridine, pyrazine, 2,3,5,6-tetramethylpyrazine, diethyl ether, di-n-butyl ether, dibenzyl ether, tetrahydrofuran, tetrahydropyran and benzophenone;

$Z^{\ominus}$ is selected from the group consisting of $BF_4^{\ominus}$, tetrakis(pentafluorophenyl)borate, tetrakis(3,5-bis(trifluoromethyl)phenyl)borate, tetrakis(2-fluorophenyl)borate, tetrakis(3-fluorophenyl)borate, tetrakis(4-fluorophenyl)borate, tetrakis(3,5-difluorophenyl)borate, tetrakis(2,3,4,5-tetrafluorophenyl)borate, tetrakis(3,4,5,6-tetrafluorophenyl)borate, tetrakis(3,4,5-trifluorophenyl)borate, methyltris(perfluorophenyl)borate, ethyltris(perfluorophenyl)borate, phenyltris(perfluorophenyl)borate, tetrakis(1,2,2-trifluoroethylenyl)borate, tetrakis(4-tri-1-propylsilyltetrafluorophenyl)borate, tetrakis(4-dimethyl-tert-butylsilyltetrafluorophenyl)borate, (triphenylsiloxy)tris(pentafluorophenyl)borate, (octyloxy)tris(pentafluorophenyl)borate, tetrakis[3,5-bis[1-methoxy-2,2,2-trifluoro-1-(trifluoromethyl)ethyl]phenyl]borate, tetrakis[3-[1-methoxy-2,2,2-trifluoro-1-(trifluoromethyl)ethyl]-5-(trifluoromethyl)phenyl]borate, and tetrakis[3-[2,2,2-trifluoro-1-(2,2,2-trifluoroethoxy)-1-(trifluoromethyl)-ethyl]-5-(trifluoromethyl)phenyl]borate, $PF_6^{\ominus}$, $SbF_6^{\ominus}$, n-$C_4F_9SO_3^{\ominus}$, $CF_3SO_3^{\ominus}$ and p-$CH_3(C_6H_4)$—$SO_3^{\ominus}$;

at least two of $R_1$, $R_2$ and $R_3$ are the same or different and is attached to the phosphorus through a tertiary carbon, which is selected from the group consisting of tert-$(C_4$-$C_{12})$alkyl, 1-$(C_1$-$C_5)$alkyl$(C_3$-$C_8)$cycloalkyl, 1-$(C_5$-$C_{12})$bicycloalkyl and 1-$(C_8$-$C_{12})$tricycloalkyl, $(C_6$-$C_{10})$aryl and $(C_6$-$C_{10})$aryl$(C_1$-$C_3)$alkyl; and the remaining $R_1$, $R_2$ or $R_3$ is methyl, ethyl, linear or branched $(C_3$-$C_{12})$alkyl, $(C_6$-$C_{10})$aryl and $(C_6$-$C_{10})$aryl$(C_1$-$C_3)$alkyl; and $R_4$, $R_5$ and $R_6$ are the same or different and each independently selected from the group consisting of methyl, ethyl and linear or branched $(C_3$-$C_{20})$alkyl, trifluoromethyl, pentafluoroethyl and linear or branched $(C_3$-$C_{20})$perfluoroalkyl.

It should be noted that the compound of formula (I) may also include other suitable solvents as coordinating solvents in place of water. Accordingly, the compounds of formula (I) can also include other solvents as exemplified in formula (IA):

(IA)

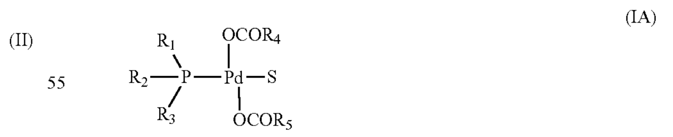

Wherein, $R_1$, $R_2$, $R_3$, $R_4$ and $R_5$ are as defined herein. S is any suitable coordinating solvent. Examples of such solvents include but not limited to alcohols, including methanol, ethanol, n-propanol, iso-propanol, butanols, and the like; ketones, including acetone, methyl ethyl acetone, and the like, nitriles including acetonitrile, propionitrile, and the like. In a broad sense, any of the L defined in compound of formula (II) may also be used as a suitable coordinating S for the compound of formula (I).

Advantageously it has now been found that the phosphine ligated to either the compound of formulae (I) or (II) must contain at least two of the $R_1$, $R_2$ or $R_3$ to be a tertiary alkyl group. That is, the carbon bonded to phosphorus should be a tertiary carbon having bonded to three other carbon atoms and/or equivalent groups. Examples of such tertiary carbon group include without any limitation a carbon atom attached to three other straight chain or branched alkyl groups, a carbon atom which is part of a cycloalkyl and attached with another straight chain or branched alkyl group, or an apex carbon of bicyclic or tricyclic hydrocarbon, such as 1-adamantyl, 1-norbornyl, and the like. By having such phosphines coordinately bonded to palladium provides hitherto unseen catalytic activity for the compounds of formulae (I) or (II) as further exemplified below especially as vinyl addition polymerization catalysts.

In a further aspect of this invention, it has now been found that the compound of formula (II) having a counter anion, $Z^{\ominus}$, which is a weakly coordinating anion (WCA) provides better catalytic (i.e., initiator) activity. That is, the WCA is an anion which is only weakly coordinated to the cation complex. It is sufficiently labile to be displaced by a neutral Lewis base, solvent or monomer. More specifically, the WCA anion functions as a stabilizing anion to the cation complex and does not form a covalent bond with the metal atom, M. The WCA anion is relatively inert in that it is non-oxidative, non-reducing, and non-nucleophilic.

In general, the WCA can be selected from borates, phosphates, arsenates, antimonates, aluminates, boratobenzene anions, carborane, halocarborane anions, sulfonamidate or sulfonates.

Broadly speaking, suitable borate anion can be represented by Formula A, phosphate, arsenate and antimonate anions can be represented by Formula B, and aluminate anions can be represented by Formula C:

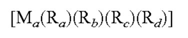 A

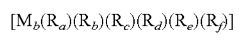 B

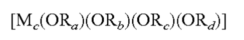 C

Wherein in Formula A, $M_a$ is boron, in Formula B $M_b$ is phosphorus, arsenic or antimony, in Formula C, Me is aluminum. $R_a$, $R_b$, $R_c$, $R_d$, $R_e$, and $R_f$ independently represent fluorine, linear or branched $C_1$-$C_{10}$ alkyl, linear or branched $C_1$-$C_{10}$ alkoxy, linear or branched $C_3$-$C_5$ haloalkenyl, linear or branched $C_3$-$C_{12}$ trialkylsiloxy, $C_{18}$-$C_{36}$ triarylsiloxy, substituted or unsubstituted aryl, or substituted or unsubstituted aryloxy groups, wherein $R_a$ to $R_f$ cannot all simultaneously represent alkoxy or aryloxy groups. When substituted the aryl groups can be monosubstituted or multisubstituted, wherein the substituents are independently selected from linear or branched $C_1$-$C_5$ alkyl, linear or branched $C_1$-$C_5$ haloalkyl, linear or branched $C_1$-$C_5$ alkoxy, linear or branched $C_1$-$C_5$ haloalkoxy, linear or branched $C_1$-$C_{12}$ trialkylsilyl, $C_6$-$C_{18}$ triarylsilyl, or halogen selected from chlorine, bromine, or fluorine.

Representative borate anions of Formula A include but are not limited to tetrafluoroborate, tetraphenylborate, tetrakis (pentafluorophenyl)borate, tetrakis(3,5-bis(trifluoromethyl) phenyl)borate, tetrakis(2-fluorophenyl)borate, tetrakis(3-fluorophenyl)borate, tetrakis(4-fluorophenyl)borate, tetrakis (3,5-difluorophenyl)borate, tetrakis(2,3,4,5-tetrafluorophenyl)borate, tetrakis(3,4,5,6-tetrafluorophenyl)borate, tetrakis(3,4,5-trifluorophenyl)borate, methyltris(perfluorophenyl)borate, ethyltris(perfluorophenyl)borate, phenyltris(perfluorophenyl)borate, tetrakis(1,2,2-trifluoroethylenyl) borate, tetrakis(4-tri-iso-propylsilyltetrafluorophenyl) borate, tetrakis(4-dimethyl-tert-butylsilyltetrafluorophenyl) borate, (triphenylsiloxy)tris(pentafluorophenyl)borate, (octyloxy)tris(pentafluorophenyl)borate, tetrakis[3,5-bis[1-methoxy-2,2,2-trifluoro-1-(trifluoromethyl)ethyl]phenyl] borate, tetrakis[3-[1-methoxy-2,2,2-trifluoro-1-(trifluoromethyl)ethyl]-5-(trifluoromethyl)phenyl]borate, and tetrakis [3-[2,2,2-trifluoro-1-(2,2,2-trifluoroethoxy)-1-(trifluoromethyl)ethyl]-5-(trifluoromethyl)phenyl]borate.

Representative phosphates, arsenates, antimonates of Formula B include but are not limited to hexafluorophosphate, hexaphenylphosphate, hexakis(pentafluorophenyl)phosphate, hexakis(3,5-bis(trifluoromethyl)phenyl)phosphate, hexafluoroarsenate, hexaphenylarsenate, hexakis(pentafluorophenyl)arsenate, hexakis(3,5-bis(trifluoromethyl)phenyl) arsenate, hexafluoroantimonate, hexaphenylantimonate, hexakis(pentafluorophenyl)antimonate, hexakis(3,5-bis(trifluoromethyl)phenyl)antimonate, and the like.

Representative aluminate anions of Formula C include but are not limited to tetrakis(pentafluorophenyl)aluminate, tris (nonafluorobiphenyl)fluoroaluminate, (octyloxy)tris(pentafluorophenyl)aluminate, tetrakis(3,5-bis(trifluoromethyl) phenyl)aluminate, and methyltris(pentafluorophenyl) aluminate.

In an embodiment of this invention suitable $Z^{\ominus}$ is selected from $B(C_6F_5)_4^{\ominus}$, $B[C_6H_3(CF_3)_2]_4^{\ominus}$, $B(C_6H_5)_4^{\ominus}$, $[Al(OC(CF_3)_2C_6F_5)_4]^{\ominus}$, $BF_4^{\ominus}$, $PF_6^{\ominus}$, $AsF_6^{\ominus}$, $SbF_6^{\ominus}$, $(CF_3SO_2)N^{\ominus}$ and $CF_3SO_3^{\ominus}$.

In some embodiments the compound of formula (II) is having L selected from acetonitrile or propionitrile.

In yet some other embodiments the compound of formula (II) is having $Z^{\ominus}$ is selected from the group consisting of tetrakis(pentafluorophenyl)borate, tetrakis(3,5-bis(trifluoromethyl)phenyl)borate, tetrakis(2-fluorophenyl)borate, tetrakis(3-fluorophenyl)borate, tetrakis(4-fluorophenyl)borate, tetrakis(3,5-difluorophenyl)borate, tetrakis(2,3,4,5-tetrafluorophenyl)borate, tetrakis(3,4,5,6-tetrafluorophenyl) borate and tetrakis(3,4,5-trifluorophenyl)borate.

In yet some other embodiments the compound of formulae (I) or (II) is having at least two of $R_1$, $R_2$ and $R_3$ are the same and is selected from the group consisting of tert-butyl, tert-pentyl (2-methylbut-2-yl or tert-amyl), 2-ethylbutyl, tert-hexyl (2-methylpentyl), tert-heptyl (2-methylhexyl), 2,3,3-trimethylbut-2-yl, 1-methylcyclopentyl, 1-methylcyclohexyl, 1-methylcycloheptyl, 1-bicyclo[2,2,1]heptyl, 1-bicyclo[2,2,2]octyl and 1-adamantyl, and the remaining $R_1$, $R_2$ or $R_3$ is selected from methyl, ethyl, n-propyl, iso-propyl, n-butyl, iso-butyl, n-pentyl, 3-methylbutyl (iso-amyl) and 2,2-dimethylpropyl (neopentyl). It should further be noted that all of the above alkyl groups defined for two of $R_1$, $R_2$ and $R_3$ are attached to phosphine through the tertiary substituted carbon as numbered for each of the alkyl group above. That is, for example, 2-methylbutyl means that the second carbon atom of butyl is attached to phosphorus which is also substituted with methyl.

In yet some other embodiments $R_4$, $R_5$ and $R_6$ are the same or different and each independently selected from the group consisting of methyl, ethyl, n-propyl, iso-propyl, n-butyl, iso-butyl, trifluoromethyl, pentafluoroethyl and heptafluoropropyl.

Non-limiting representative examples of compounds of formula (I) may be enumerated as follows:

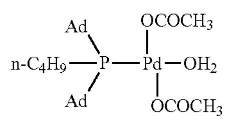

n-butyldi-1-adamantylphosphine palladium diacetate($H_2O$) (Pd601);

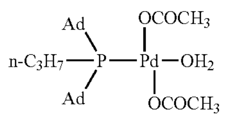

n-propyldi-1-adamantylphosphine palladium diacetate ($H_2O$);

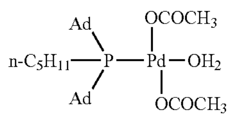

n-pentyldi-1-adamantylphosphine palladium diacetate ($H_2O$);

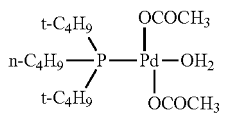

n-butyldi-tert-butylphosphine palladium diacetate($H_2O$) (Pd445);

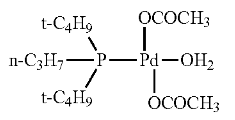

n-propyldi-tert-butylphosphine palladium diacetate($H_2O$);

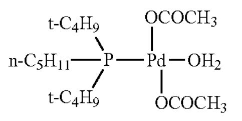

n-pentyldi-tert-butylphosphine palladium diacetate($H_2O$);

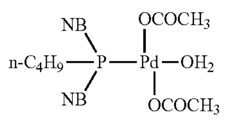

n-butyldi-1-norbornanylphosphine palladium diacetate ($H_2O$); and

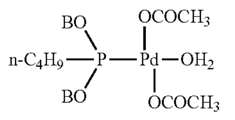

n-butyldi-1-bicyclo[2,2,2]octylphosphine palladium diacetate($H_2O$).

Non-limiting representative examples of compounds of formula (II) may be enumerated as follows:

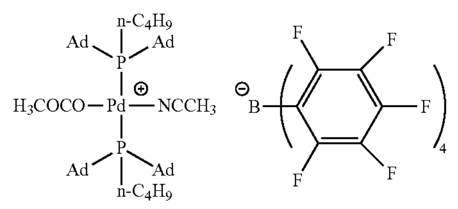

bis(n-butyldi-1-adamantylphosphine) palladium acetate(acetonitrile) tetrakis(pentafluorophenyl)borate;

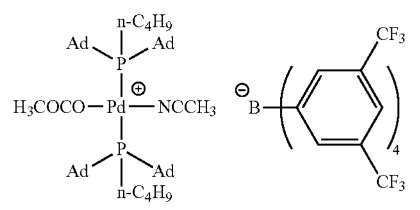

bis(n-butyldi-1-adamantylphosphine) palladium acetate(acetonitrile) tetrakis(3,5-bis(trifluoromethyl)phenyl)borate; and

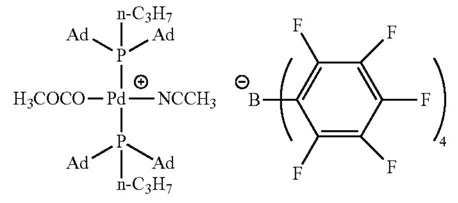

bis(n-propyldi-1-adamantylphosphine) palladium acetate (acetonitrile) tetrakis(pentafluorophenyl)borate.

The compounds of this invention can be synthesized by any of the procedures known to one skilled in the art. Specifically, several of the starting materials used in the preparation of the compounds of this invention are known or are themselves commercially available. The compounds of this invention and several of the precursor compounds may also be prepared by methods used to prepare similar compounds as reported in the literature and as further described herein. It should be further emphasized that the compounds of formulae (I) or (II) can be synthesized very readily even in an industrial scale using simple methods as further exemplified by specific examples that follows below. Accordingly, this invention offers a cost effective methods to form compounds of formulae (I) or (II) thus providing additional advantages in their utility as vinyl addition polymerization catalysts.

More specifically, the compounds disclosed herein can be synthesized according to the following procedures of Scheme 1 and Scheme 2, wherein the $R_1$, $R_2$, $R_3$, $R_4$, $R_5$, $R_6$, L and Z are as defined for Formula I and II respectively unless otherwise indicated.

In Scheme I, a suitable phosphine (IC) is reacted with an appropriate palladium compound (IB) to form a compound of formula (I) in the presence of water. This reaction can be carried out by any of the procedures known in the art. For example, a solution of an appropriate palladium compound (IB) is reacted with a solution of suitable phosphine (IC) at sub-ambient reaction conditions. Generally such reactions are carried out in an inert atmosphere in the presence of water. The reaction temperature employed is generally sub-ambient to ambient temperatures in the range of −78° C. to 25° C. Any of the solvents that would dissolve the palladium compound (IB) and the phosphine (IC) can be used. Examples of such solvents include toluene, and other hydrocarbon solvents and mixtures in any combination thereof.

Scheme 1

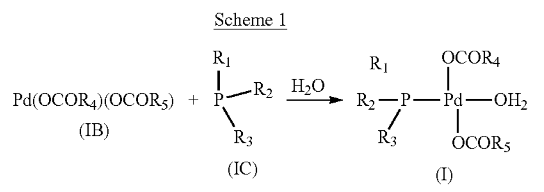

(IB) (IC) (I)

As illustrated in Scheme 1 the synthesis of a compound of formula (I) requires only a simple one step reaction. The quantitative conversion to compound of formula (I) can generally be achieved with yields ranging from about 90% or higher. As it would be seen from the description that follows the compound of formula (I) is a very active catalyst in vinyl addition polymerization even at very low levels of catalyst and conversion of monomers to polymers is generally around 99% or higher in a short reaction time of 30 minutes to one hour. Further, the polymer thus formed exhibits superior optical, thermal and mechanical properties as evidenced by several specific examples that follow.

Scheme 2 illustrates synthesis of compounds of formula (II). As illustrated in Scheme 2, step 1, a palladium compound (IIA) is reacted with a suitable phosphine (IIB) in a suitable solvent at a suitable reaction conditions to obtain a compound of formula (IIC). Generally, such reactions are carried out at sub-ambient to ambient temperatures ranging from −78° C. to 25° C. in chlorinated solvents, such as for example, dichloromethane. In Scheme 2, step 2, the compound of formula (IIC) is reacted with a suitable compound of formula (III) to form a compound of formula (II). For example, the compound of (IIC) can be reacted with a suitable salt of a weakly coordinating anion, for example, a lithium salt, LiZ, to form the compound of formula (II). Typically, such reactions are carried out at room temperature in a suitable solvent, which is capable of coordinating with palladium. Examples of such ligating solvents are those as described hereinabove, such as for example acetonitrile. It should be noted that both of these reaction steps are carried out in an inert atmosphere such as for example nitrogen, helium or argon.

Scheme 2

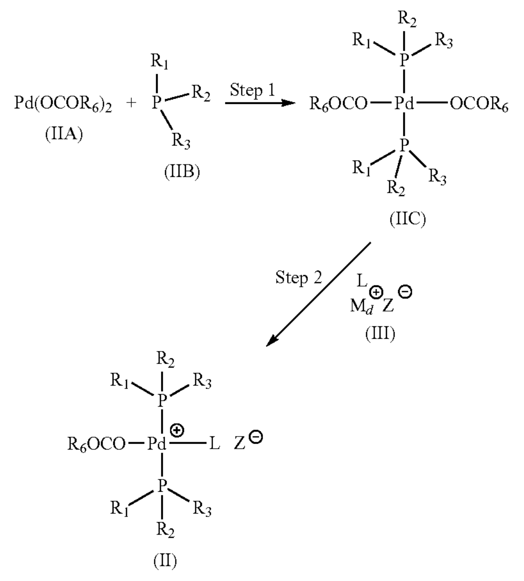

(IIA) (IIB) (IIC) (III) (II)

Thus in yet another aspect of this invention there is provided a vinyl addition polymerization catalyst comprising a compound of formula (I) according to this invention. In yet another aspect of this invention there is also provided a vinyl addition polymerization catalyst comprising a compound of formula (II) according to this invention.

In a further aspect of this invention there is also provided a polymerization composition comprising:

a) a palladium compound selected from the group consisting of a compound of formula (I) as described herein and a compound of formula (II) as described herein;

b) a compound of formula (III):

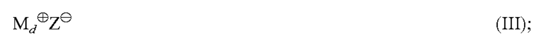

$M_d^{\oplus}Z^{\ominus}$ (III);

wherein $M_d^{\oplus}$ is a cation selected from lithium, sodium, potassium, cesium, barium, ammonium, linear or branched tetra $(C_1-C_4)$alkyl ammonium and dialkylanilinium;

$Z^{\ominus}$ is a weakly coordinating anion selected from selected from $B(C_6F_5)_4^{\ominus}$, $B[C_6H_3(CF_3)_2]_4^{\ominus}$, $B(C_6H_5)_4^{\ominus}$, $[Al(OC(CF_3)_2C_6D_5)_4]^{\ominus}$, $BF_4^{\ominus}$, $PF_6^{\ominus}$, $AsF_6^{\ominus}$, $SbF_6^{\ominus}$, $(CF_3SO_2)N^{\ominus}$ or $CF_3SO_3^{\ominus}$; and c) at least one monomer of formula (IV):

(IV)

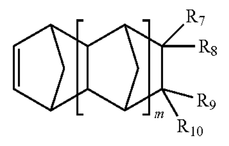

wherein:

m is an integer 0, 1 or 2;

$R_7$, $R_8$, $R_9$ and $R_{10}$ are the same or different and each independently of one another is selected from hydrogen, linear or branched $(C_1-C_{16})$alkyl, hydroxy$(C_1-C_{16})$alkyl, perfluoro$(C_1-C_{12})$alkyl, $(C_3-C_{12})$cyclo alkyl, $(C_6-C_{12})$bicycloalkyl, $(C_7-C_{14})$tricyclo alkyl, $(C_6-C_{10})$aryl, $(C_6-C_{10})$aryl$(C_1-C_3)$alkyl, perfluoro$(C_6-C_{10})$aryl, perfluoro($C_6$-$C_{10}$) aryl($C_1$-$C_3$)alkyl, di($C_1$-$C_2$)alkylmaleimide($C_3$-$C_6$)alkyl, di($C_1$-$C_2$)alkylmaleimide($C_2$-$C_6$) alkoxy($C_1$-$C_2$)alkyl, hydroxy, ($C_1$-$C_{12}$)alkoxy ($C_3$-$C_{12}$) cyclo alkoxy ($C_6$-$C_{12}$)bicyclo alkoxy, ($C_7$-$C_{14}$) tricycloalkoxy, ($C_6$-$C_{10}$)aryloxy($C_1$-$C_3$)alkyl, ($C_5$-$C_{10}$) heteroaryloxy($C_1$-$C_3$)alkyl, ($C_6$-$C_{10}$)aryloxy, ($C_5$-$C_{10}$) heteroaryloxy or ($C_1$-$C_6$)acyloxy, where each of the aforementioned substituents are optionally substituted with halogen or hydroxy.

It should be noted that any of the compounds of formulae (I) or (II) can be employed in the polymerization composition of this invention. The polymerization reactions can be carried out either neat (mass polymerization) or in solution. That is, by practice of the instant invention it is now possible to make a variety of polymers containing at least one functionalized norbornene monomer (i.e., a compound of formula (IV)) in the presence of either a compound of formulae (I) or (II)) as a catalyst in combination with a compound of formula (III) as described herein. Generally, a combination of a compound of formulae (I) or (II) is used along with a compound of formula (III), and thus they are called as bicomponent catalysts. The compounds of formulae (I) or (II) are generally be called as procatalysts and compounds of formula (III) are generally called as activators.

As noted above, it has now been found that the compounds of formulae (I) or (II) are highly active as vinyl addition polymerization catalysts in combination with one or more compounds of formula (III). Thus it is now possible to make polymers of high quality by employing small amounts of the catalysts. Accordingly, in one of the embodiments, the vinyl addition polymerization can effectively be carried out using monomer to procatalyst molar ratio of at least 10,000:1 based on the total moles of monomers and the catalyst employed. That is, 10,000 moles of monomer to one mole of the catalyst is employed. In other embodiments the molar ratio of monomer:procatalyst can be 1,000,000:1; 500,000:1; 100,000:1; 50,000:1, 20,000:1; 15,000:1, and the like. In some other embodiments the molar ratio of monomer:procatalyst:activator can be at least 10,000:1:1. In other embodiments the molar ratio of monomer:procatalyst:activator can be 1,000,000:1:1; 500,000:1:1; 100,000:1:1; 50,000:1:1; 20,000:1:1; 15,000:1:1, and the like. In some embodiments the activator is used in excess of the mole quantities of the procatalyst used, such as for example, molar ratios of procatalyst:activator can be from 1:1 to 1:6.

Accordingly, by employing compounds of formulae (I) or (II) in the polymerization composition of this invention it is now possible to form polymers at very high conversions and having higher molecular weights, which feature superior properties than the ones formed in accordance with the palladium compounds of prior art. See for example, U.S. Patent Application Pub. No. US 2005/0187398 A1.

As noted, the mass polymerization reaction can be carried out with catalyst and monomer without any solvent. Advantageously, such polymerization reactions can also be carried out in a mold at a suitable temperature to form three dimensional polymeric products. In general, the reaction temperatures can range from sub-ambient temperature, such as for example below 0° C. to boiling point of the monomers, however, it is recommended that the components of the reaction vessel or the mold is not heated beyond the flash points of one or more of the monomers. Generally, the mass polymerization is carried out at a temperature range from about 10° C. to 200° C., in some other embodiments the temperature range can be from about 15° C. to 150° C.; or from about 20° C. to 100° C.

Since the polymerization reaction is exothermic, the temperature in the mold during the course of the polymerization is usually higher than the temperature of the feed, unless a chilled mold is employed. Accordingly, the initial mold temperature can generally be within the range of about −20° C. to about 200° C.; or from about 0° C. to about 150° C.; or from 20° C. to 100° C. Temperature distribution in the mold is affected by such factors as mold geometry, characteristics of the mold as a heat sink or heat supplying means, reactivity of catalyst and monomer, and the like. To some extent, the selection of suitable temperatures and heat exchange conditions will have to be based on experience with a given system of mold, feed and catalyst.

After the polymerization reaction is complete, the molded object may be subjected to an additional post cure treatment at a temperature in the range of about 100° C. to 250° C. for about 15 minutes to 24 hours; or 1 to 2 hours. Such a post cure treatment can enhance polymeric properties including glass transition temperature ($T_g$) and heat distortion temperature (HDT). In addition, post curing is desirable but not essential, to bring the samples to their final stable dimensional states, to minimize residual odors, and to improve final physical properties.

The vinyl addition polymerization can also be carried out in solution employing a compound of formulae (I) or (II) in combination with a compound of formula (III) as described herein. In this embodiment, the solution of the catalyst is suitably mixed with a desirable solution of one or more of the monomers (i.e., a compound of formula (IV)) under conditions known in the art to form the polymers of this invention. Suitable polymerization solvents include without any limitation alkane and cycloalkane solvents, such as pentane, hexane, heptane, and cyclohexane; halogenated alkane solvents such as dichloromethane, chloroform, carbon tetrachloride, ethylchloride, 1,1-dichloroethane, 1,2-dichloroethane, 1-chloropropane, 2-chloropropane, 1-chlorobutane, 2-chlorobutane, 1-chloro-2-methylpropane, and 1-chloropentane; ethers such as THF and diethylether; aromatic solvents such as benzene, xylene, toluene, mesitylene, chlorobenzene, and o-dichlorobenzene; and halocarbon solvents such as Freon® 112; and mixtures in any combination thereof.

Advantageously, it has been further found that the compounds of formulae (I) or (II) can be prepared in situ. Then the vinyl addition polymerization with one or more olefinic monomers of formula (IV) can be carried out in the same reaction vessel by addition of a compound of formula (III). Thus, the present invention provides uniquely advantageous benefits for an industrial scale manufacture of polymers. Most advantageously, this approach eliminates preparation and storage of compounds of formulae (I) or (II) among many other advantages afforded by the practice of this invention.

The solution polymerization temperatures can range from sub-ambient temperature, such as for example, below 0° C. to boiling point of the solvents employed. However, it should be noted that such solution polymerization can also be carried out at a temperature higher than the boiling point of the solvent in a closed pressure vessels. Generally, the solution polymerization is carried out at a temperature range from about 10° C. to 150° C., in some other embodiments the temperature range can be from about 30° C. to 125° C.; or from about 50° C. to 100° C. Further, the solution polymerization is carried out under an inert atmosphere, such as for example, under nitrogen, helium or argon atmosphere and using anhydrous solvents.

The polymers formed according to this invention generally exhibit a weight average molecular weight ($M_w$) of at least about 20,000. In another embodiment, the polymer of this invention has a $M_w$ of at least about 25,000. In another embodiment, the polymer of this invention has a $M_w$ of at least about 40,000. In another embodiment, the polymer of this invention has a $M_w$ of at least about 60,000. In yet another embodiment, the polymer of this invention has a $M_w$ of at least about 80,000. In some other embodiments, the polymer of this invention has a $M_w$ of at least about 100,000. In another embodiment, the polymer of this invention has a $M_w$ of higher than 200,000 and can be higher than 500,000 in some other embodiments. The weight average molecular weight (MO of the polymers can be determined by any of the known techniques, such as for example, by gel permeation chromatography (GPC) equipped with suitable detector and calibration standards, such as differential refractive index detector calibrated with narrow-distribution polystyrene standards or polybutadiene (PBD) standards. The polymers of this invention typically exhibit polydispersity index (PDI) higher than 3, which is a ratio of weight average molecular weight ($M_w$) to number average molecular weight ($M_n$). In general, the PDI of the polymers of this invention ranges from 3 to 5. In some embodiments the PDI is higher than 3.5, higher than 4, higher than 4.5, or can be higher than 5. However, it should be noted that in some embodiments the PDI can be lower than 3, such as for example, 2.5.

Advantageously, a composition containing a vinyl addition polymer formed from a palladium compound of formulae (I) or (II) with very high conversion at low (for example 25,000-50,000 to 1) catalyst loading, where the polymer's molecular weight is controlled using a chain transfer agent, such as, triethylsilane (TES) can give crystal clear polymer solution that then is extruded with the aid of the polymerization solvent to yield clear film that can be stretched to produce film having hitherto unattainable properties, such as for example, extremely low coefficient of thermal expansion (CTE), which can be as low as 200 ppm/° K, below 150 ppm/° K, 100 ppm/° K, 50 ppm/° K or lower than 40 ppm/° K. Various other chain transfer agents can also be used to control the molecular weight of the resulting polymer as described herein, including for example, bicyclo [4.2.0]oct-7-ene (BCO), formic acid, various other silanes, and the like, including mixtures in any combination thereof. Use of various CTAs in vinyl addition polymerization in order to control the resulting polymer properties is well known in the art. See, for example, U.S. Pat. No. 9,771,443 B2, pertinent portions of which are incorporated herein by reference.

In some embodiments the polymerization composition according to this invention comprises a solvent. Suitable solvents that can be employed in this embodiment may be selected without any limitation from the group consisting of methanol, ethanol, n-propanol, iso-propanol, n-butanol, iso-butanol, tert-butanol, pentane, hexane, heptane, octane, decane, cyclohexane, dichloromethane, chloroform, carbon tetrachloride, chloroethane, 1,1-dichloroethane, 1,2-dichloroethane, 1-chloropropane, 2-chloropropane, 1-chlorobutane, 2-chlorobutane, 1-chloro-2-methylpropane, 1-chloropentane, benzene, toluene, o-, m-, or p-xylenes, mesitylene, chlorobenzene, o-dichlorobenzene, tetrahydrofuran (THF), diethylether, petroleum ether and mixtures in any combination thereof.

Any of the compound of formula (I) as enumerated herein, if employed, can be used in the polymerization composition of this invention. Similarly, any of the compound of formula (II) as enumerated herein, if employed, can be used in the polymerization composition of this invention.

Non-limiting examples of the activators, i.e., the compound of formula (III) that can be employed in the polymerization composition according to this invention may be enumerated as follows:

lithium tetrafluoroborate;
lithium triflate;
lithium tetrakis(pentafluorophenyl)borate (LiFABA);
lithium tetraphenylborate;
lithium tetrakis(3,5-bis(trifluoromethyl)phenyl)borate;
lithium tetrakis(2-fluorophenyl)borate;
lithium tetrakis(3-fluorophenyl)borate;
lithium tetrakis(4-fluorophenyl)borate;
lithium tetrakis(3,5-difluorophenyl)borate;
lithium hexafluorophosphate;
lithium hexaphenylphosphate;
lithium hexakis(pentafluorophenyl)phosphate;
lithium hexafluoroarsenate;
lithium hexaphenylarsenate;
lithium hexakis(pentafluorophenyl)arsenate;
lithium hexakis(3,5-bis(trifluoromethyl)phenyl)arsenate;
lithium hexafluoroantimonate;
lithium hexaphenylantimonate;
lithium hexakis(pentafluorophenyl)antimonate;
lithium hexakis(3,5-bis(trifluoromethyl)phenyl)antimonate;
lithium tetrakis(pentafluorophenyl)aluminate;
lithium tris(nonafluorobiphenyl)fluoroaluminate;
lithium (octyloxy)tris(pentafluorophenyl)aluminate;
lithium tetrakis(3,5-bis(trifluoromethyl)phenyl)aluminate;
lithium methyltris(pentafluorophenyl)aluminate; and
N,N-dimethylaniliniumtetrakis(pentafluorophenyl)-borate (DANFABA).

Any of the olefinic monomers known in the art can be employed in the polymerization composition of this invention that would bring about the intended benefit. Non-limiting examples of monomers of formula (IV) that can be employed in the polymerization composition according to this invention may be enumerated as follows:

bicyclo[2.2.1]hept-2-ene (NB);
5-ethylbicyclo-[2.2.1]hept-2-ene (EtNB);
5-butylbicyclo-[2.2.1]hept-2-ene (BuNB);
5-hexylbicyclo-[2.2.1]hept-2-ene (HexNB);
5-octylbicyclo[2.2.1]hept-2-ene (OctNB);
5-decylbicyclo[2.2.1]hept-2-ene (DecNB);
5-perfluorobutylbicyclo[2.2.1]hept-2-ene ($C_4F_9$NB);
5-phenethylbicyclo[2.2.1]hept-2-ene (PENB);
5-benzylbicyclo[2.2.1]hept-2-ene (BnNB);
2-(bicyclo[2.2.1]hept-5-en-2-yl)bicyclo[2.2.1]heptane (NBANB);
5-vinylbicyclo[2.2.1]hept-2-ene (VNB); and
5-ethylidenenorbornene or 2-ethylidenebicyclo[2.2.1]hept-2-ene (ENB).

It should further be noted that more than one monomer of formula (IV) can be used in the polymerization composition of this invention. Accordingly, the molar ratio of first monomer of formula (IV) to second monomer of formula (IV) can be from 1:99 to 99:1. In some embodiments, the molar ratio of first monomer of formula (IV):second monomer of formula (IV) is in the range from 5:95 to 95:5; in some other embodiments it is from 10:90 to 90:10; it is from 15:85 to 85:15; it is from 20:80 to 80:20; it is from 30:70 to 70:30; it is from 60:40 to 40:60; and it is 50:50, and so on. All such combinations are part of this invention. It should further be noted that various other olefinic monomers can also be used in the polymerization composition of this invention in any desirable amounts depending upon the intended end applications.

It should also be noted that more than two distinct monomers of formula (IV) can be employed in the polymerization composition of this invention. Accordingly, in some embodiments three distinct monomers of formula (IV) are employed in any molar ratios. In yet some other embodiments four distinct monomers of formula (IV) or five distinct monomers of formula (IV) in any molar ratios can be used.

In another aspect of this invention there is provided a polymer solution obtained by polymerizing at least one polycycloolefin monomer in the presence of a palladium compound according to this invention. As discussed above since the compounds of formulae (I) or (II) are highly active catalysts it is now possible to form a polymer solution of very high concentration. That is, the polymer solutions formed according to this invention contain solid polymer higher than twenty weight percent. In some other embodiments the polymer solution contains higher than thirty weight percent, higher then forty weight percent or even higher than fifty weight percent. As the catalyst loadings are very low, the polymer thus formed is generally pure and can be used as such in the intended applications. However, the polymer solution can also be purified, i.e., remove any trace catalytic impurities using any of the known methods in the art.

In a further aspect of this invention there is also provided a polymer solution according to this invention, which can be extruded into a film. As noted above, the polymer solutions formed according to this invention contain very high polymer content of up to fifty weight percent polymer. Thus, it is now possible to employ the polymer solution in an extruder to form films. Any of the techniques known in the art to form films using a thermoplastic films can be employed herein. Such techniques include without any limitation extrusion, calender and casting methods, among others. However, it should be emphasized that generally such extrusion techniques involve melt processing of the polymer. Since the polymer formed in accordance with this invention exhibits high glass transition temperatures, which can be higher than 300° C., it is very difficult to melt process the polymer at such high temperatures because of the fact the polymer will also begin to decompose at such high processing temperatures.

Advantageously it has now been found that the polymer solutions formed in accordance with this invention can be employed directly in an extruder using processes similar to that used in the art for melt extruding the polymers albeit at much lower temperatures. Accordingly, in accordance with the practice of this invention the polymer solution can be extruded into film using any of the extruders known in the art. In this method, the polymer solution is fed into a suitable extruder and melt kneaded at suitable temperature and then passed through a suitable die to form a film of desirable thickness and cooled to form film. As lower temperatures are employed in such polymer solution extrusion methods yellowing, curling, degradation of polymer (i.e., lowering the molecular weight) and other defects in forming the films are either minimized or eliminated, thus offering advantages over melt extrusion methods.

Accordingly, in another aspect of this invention there is provided a film formed from the polymer solution according to this invention. The film thus formed exhibits no yellowing, no decrease in molecular weight, or curling. Most importantly, the polymer formed in accordance of this invention having a high glass transition temperature ($T_g$), which is generally higher than 200° C., can readily be formed into a film at a low cost, which still exhibits high $T_g$ of higher than 200° C. and having an average thickness greater than about 20 μm and less than about 500 μm.

More specifically, the film produced according into this invention involves the following steps:

Extruding a polymer solution in accordance with this invention through an extruder while kneading the solution and heating to a temperature lower than the softening temperature of the polymer, i.e., at a temperature below polymer's glass transition temperature ($T_g$);

Forming the film of desirable thickness while extruding through a suitable film die attached to the extruder; and Drying the extruded film at a suitable temperature to remove the solvent. The drying of the film to remove any residual solvents and/or other volatile impurities can be carried out a temperature depending upon the types of solvents used to extrude the film. Generally, such drying temperature can range from about 50° C. to 280° C. in an inert atmosphere or under vacuum. In some embodiments the drying of the film is performed at a temperature in the range of about 100° C. to 250° C. under vacuum from about 30 minutes to 4 hours; 150° C. to 220° C. under vacuum from about 1 hour to 3 hours; 170° C. to 200° C. under vacuum from about 1 hour to 2 hours.

Any of the solvents as disclosed herein which dissolves the polymer can also be used to dissolve the polymer to form the polymer solution in the event the polymer is already isolated as a solid as disclosed herein. The concentration of the polymer in the solution can range from five weight percent or more or thirty percent or less. In some embodiments the polymer content in the solution is about ten percent, fifteen percent, eighteen percent, twenty percent or twenty-five percent. In some embodiments the polymer content in the solution can be higher than thirty weight percent, higher than forty weight percent, higher than fifty weight percent or higher.

The extruder employed can be any one of the ones known in the art which can be employed for such film extrusion process. Typically, a single screw or a twin screw extruders are employed. The screw can be constructed of several elements including mixing elements, kneading elements, and the like as is well known in the art.

The film thickness is controlled by employing desirable die attached to the extruder as is well known in the art of film extrusion. The extruded film sheet is taken up on a roller and dried at a temperature in the range of 50° C. to 250° C. so as to remove all residual solvents in the film. The film thus formed is substantially transparent to visible light. That is, most of the visible light is transmitted through the film. In some embodiments such films formed from the polymerization composition of this invention exhibit a transmission of equal to or higher than 90 percent of the visible light. In some other embodiments such films formed from the polymerization composition of this invention exhibit a transmission of equal to or higher than 95 percent of the visible light.

The films thus formed are then evaluated for their optical properties using any of the methods known in the art. For example, the refractive index of the film across the visible spectrum can be measured by ellipsometry. The optical quality of the film can be determined by visual observation. Quantitatively the percent transparency can be measured by visible spectroscopy. Generally, the films formed according to this invention exhibit excellent optical transparent properties and can be tailored to desirable transparency as described herein.

Finally, the film can be stretched uniaxially or biaxially in order to obtain improved thermal and mechanical properties. For example, it has now been found that biaxial stretching of the film so formed lowers the coefficient of thermal expansion (CTE) of the film up to ten percent. Similar reduction in CTE has been observed for uniaxially stretched films. Generally, tensile and flexural modulus are also increased by such biaxial and/or uniaxial stretching.

In another aspect of this invention there is further provided an article comprising an optical layer comprising an optical polymer obtained by polymerizing at least one polycycloolefin monomer of formula (IV) in the presence of a palladium compound of formulae (I) or (II).

In yet another aspect of this invention there is provided a film formed from a polymer solution obtained by a polymerization composition comprising:

a) a palladium compound selected from the group consisting of:
   a compound of formula (I) as described herein and a compound of formula (II) as described herein;
b) a compound of formula (III) as described herein; and
c) at least one monomer of formula (IV) as described herein.

Advantageously, it has now been found that the film formed in accordance with the extrusion process of this invention exhibits superior optical, thermal and mechanical properties. For example, the film formed by extrusion process of this invention exhibits glass transition temperature ($T_g$) of at least 200° C. and storage modulus of at least $1\times10^4$ Pascal at 100° C.

In another aspect of this embodiment, the vinyl addition polymers formed from the palladium compounds of formulae (I) or (II) and suitable olefinic monomers of formula (IV) can be readily processed into various solid forms such as for example films. In one aspect of this invention, a composition containing a vinyl addition polymer of this invention in a suitable solvent can be used in a solvent-assisted extrusion of film.

This invention is further illustrated by the following examples which are provided for illustration purposes and in no way limit the scope of the present invention.

EXAMPLES (GENERAL)

The following abbreviations have been used hereinbefore and hereafter in describing some of the compounds, instruments and/or methods employed to illustrate certain of the embodiments of this invention:

Pd601—Palladium diacetate diadamantyl(n-butyl) phosphine($H_2O$);
Pd445—$Pd(OAc)_2$(P(t-butyl)$_2$(n-butyl))($H_2O$);
Pd1602—[Pd(OAc)(MeCN)($PAd_2$-n-Bu)$_2$]$B(C_6F_5)_4$;
Pd942—$Pd(OAc)_2$($PAd_2$-n-Bu)$_2$;
Pd785—$Pd(OAc)_2(PCy_3)_2$;
Pd613—N,N-bis((2,6-diisopropylphenyl)-imidazol-2-ylidene) $Pd(OAc)_2$
LiFAB A—lithium (diethyl ether) tetrakis(pentafluorophenyl)borate ($[Li(OEt_2)_{2.5}][B(C_6F_5)_4]$);
NB—norbornene;
HexNB—5-hexylbicyclo-[2.2.1]hept-2-ene;
Ad—adamantane; Cy—cyclohexyl; Bu—butyl; BCO—bicyclo[4.2.0]oct-7-ene; TES—triethylsilane; EtOH—ethanol; CTA—chain transfer agent; IPA—isopropanol; DCM—dichloromethane; THF—tetrahydrofuran; GPC—gel permeation chromatography; HPLC—high performance liquid chromatography; $M_w$—weight average molecular weight; $M_n$—number average molecular weight; PDI—polydispersity;
GC-MS—gas chromatography-mass spectroscopy;
NMR—nuclear magnetic resonance spectroscopy; FT-IR—Fourier transform-infrared spectroscopy.

All palladium compounds described herein were prepared using standard Schlenk or dry box techniques, unless stated otherwise. Anhydrous toluene and pentane were purchased from Aldrich, sparged with $N_2$ and used without further purification. Palladium acetate ($Pd(OAc)_2$) was purchased from Johnson Matthey. Di-tert-butyl(n-butyl) phosphine was obtained from Solvay and di-adamantyl(n-butyl) phosphine were purchased from Strem.

Example 1

Palladium Diacetate Diadamantyl-(n-Butyl) Phosphine($H_2O$) (Pd601)

A solution of palladium acetate (0.7 g, 3.12 mmol) in anhydrous toluene (20 mL) mixed with deionized water (0.112 mL, 6.14 mmol) was placed in Schlenk flask purged with nitrogen, and the mixture was cooled to −78° C. (dry ice/IPA bath) while stirring. n-Butyl-di-1-adamantylphosphine (1.12 g, 3.12 mmol) was dissolved in anhydrous toluene (8 mL) under $N_2$ atmosphere and was added dropwise to the stirred palladium acetate solution. The mixture was stirred for additional period of 15 min. at −78° C. Then, the mixture was allowed to warm up to ambient temperature and stirred overnight. The yellow solution turned into a yellow suspension overnight. The yellow precipitate was collected by filtration. The obtained solid was washed with toluene (15 mL×3) and pentane (15 mL×3) to obtain a yellow solid, which was dried in vacuum. Yield 1.54 g (82%).

Figure 2:
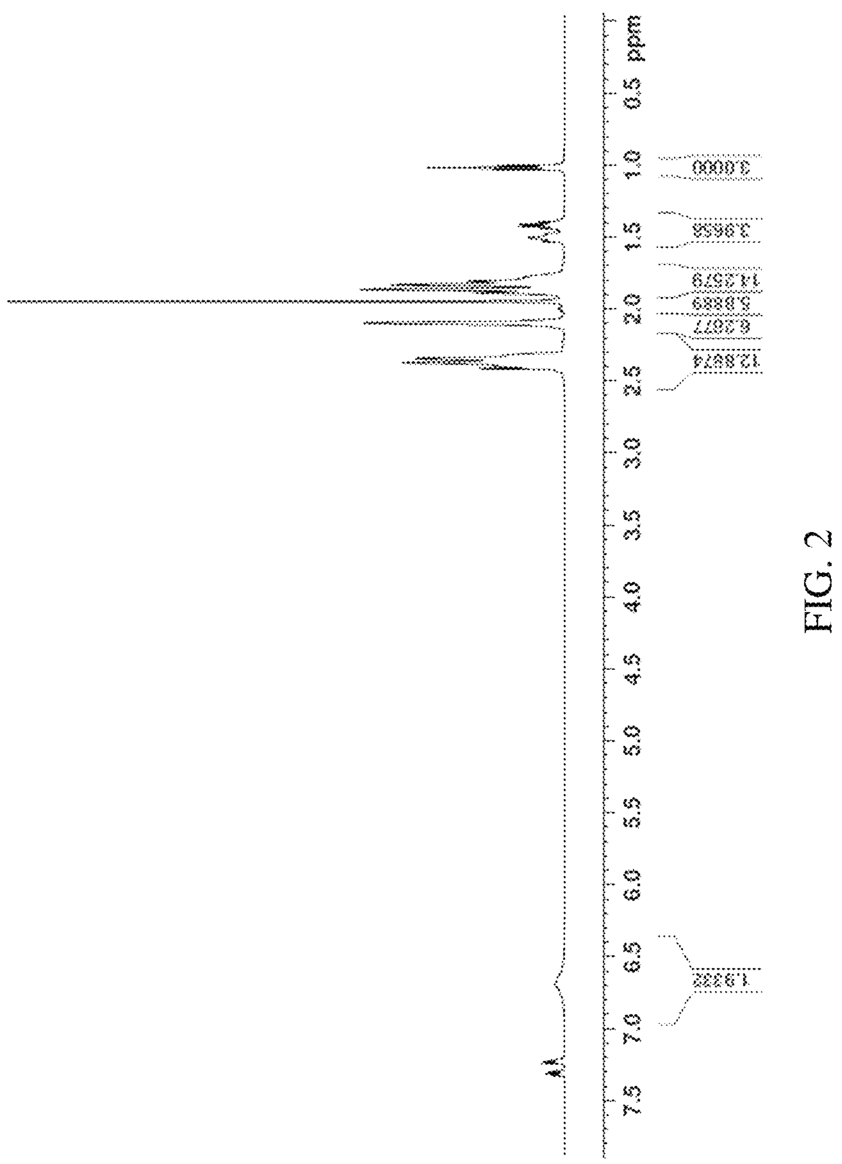
FIG. 2 shows a $^1H$ NMR of palladium diacetate diadamantyl-(n-butyl)phosphine($H_2O$) (Pd601), an illustrative example of a palladium compound of formula (I) in accordance with this invention, also exemplified in Example 1.

The crystals of the title compound was grown in a solvent mixture of DCM/pentane and characterized by x-ray diffraction crystallography. X-ray intensity data were measured on a Bruker CCD-based diffractometer with dual Mo ImuS microfocus optics (Mo Kα radiation, λ=0.71073 Å). A crystal was mounted on a cryoloop using Paratone oil and placed under a steam of nitrogen at 171 K (Oxford Cryosystems). The detector was placed at a distance of 5.00 cm from the crystal. The data were corrected for absorption with the SADABS program. The structures were refined using the Bruker SHELXTL Software Package (Version 6.1) and were solved using direct methods until the final anisotropic full-matrix, least squares refinement of $F^2$ converged. FIG. 1 shows the crystal structure. The compound was further characterized by 1H and $^{31}P$ NMR. FIG. 2 shows the $^1H$ NMR spectrum. $^1H$ NMR: ($CDCl_3$, 500 MHz): δ 0.93 (t, 3H), 1.32 (q, 2H), 1.42 (q, 2H), 1.66-1.80 (m, 14H), 1.86 (s, 6H), 2.01 (s, 6H), 2.28 (m, 12H), 5.97 (br, 2H). $^{31}P$ NMR ($CDCl_3$, 202 MHz): δ 52.46.

Example 2

$Pd(OAc)_2$(P(t-butyl)$_2$(n-butyl))($H_2O$) (Pd445)

Figure 3:
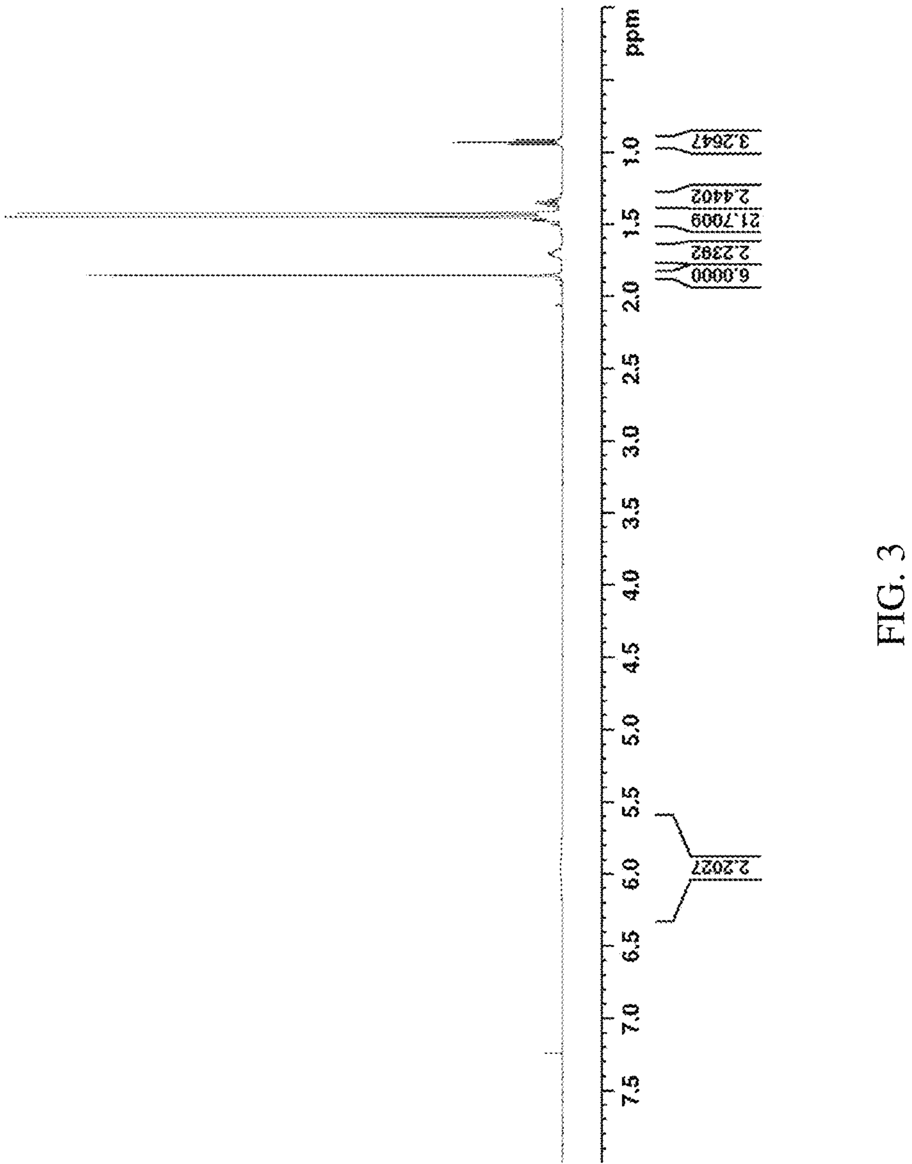
FIG. 3 shows a $^1H$ NMR of palladium diacetate di-t-butyl-(n-butyl)phosphine($H_2O$) (Pd445), an illustrative example of a palladium compound of formula (I) in accordance with this invention, also exemplified in Example 2.

A Schlenk flask equipped with a stirbar was charged with palladium acetate (1 g, 4.4 mmol) followed by purging with nitrogen. This was then dissolved in anhydrous toluene (20 mL) after which deionized water (0.16 mL, 8.9 mmol) was added. The reaction mixture was cooled to −15° C. (dry ice and 85/15 water/IPA). Di-t-butyl(n-butyl) phosphine (0.9 g, 4.4 mmol) was dissolved with anhydrous toluene (8 mL). The phosphine solution was added slowly dropwise over 10 minutes to the stirring palladium acetate solution. The reaction mixture was stirred at −15° C. for additional 15 minutes followed by warming to room temperature and stirring overnight. The resulting suspension was filtered, and the collected solids were washed with pentane (15 mL×3). The orangish yellow solids were dried under vacuum to yield 1.8 g (90%) of the target material (Pd445). The title compound was further characterized by $^{1}H$ and $^{31}P$ NMR and FT-IR. FIG. 3 shows the $^{1}H$ NMR spectrum. $^{1}H$ NMR: ($CDCl_3$, 500 MHz): δ 0.93 (t, 3H), 1.34 (q, 2H), 1.42 (d, 20H), 1.65-1.75 (m, 2H), 1.85 (s, 6H), 5.96 (br. s., 2H). $^{31}P$ NMR ($CDCl_3$, 202 MHz): δ 60.08. FT-IR (neat): ν ($cm^{-1}$) 3194 (br), 2966 (m), 2874 (m), 1628 (vs), 1465 (m), 1384 (s), 1328 (s), 1183 (m), 1018 (m), 935 (w), 900 (w), 812 (w), 720 (m), 687 (m), 618 (m).

Example 3

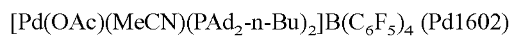
$[Pd(OAc)(MeCN)(PAd_2\text{-n-Bu})_2]B(C_6F_5)_4$ (Pd1602)

A solution of $PAd_2$-n-Bu (0.48 g, 1.34 mmol) in DCM (5 mL) was added dropwise to a reddish brown suspension of palladium acetate ($Pd(OAc)_2$) (0.12 g, 0.53 mmol) in DCM (15 mL) while stirring at −78° C. After stirring for additional ten minutes, the reaction mixture was warmed up to room temperature, and stirred for an additional period of 2 hours. The suspension turned into an orange solution. The solvent was removed under vacuum to obtain yellow oily residue. The residue was dissolved in pentane and allowed to stir to deposit yellow precipitate. The precipitate was collected by filtration, and washed with pentane (5 mL×3 times). The resulting yellow powder was dried in vacuum. Yield 0.37 g (73%).

To a suspension of the above obtained yellow solid (0.3 g, 0.32 mmol) in acetonitrile (20 mL) was added dropwise a solution of LiFABA (0.28 g, 0.32 mmol) in acetonitrile (15 mL) while stirring at room temperature. The mixture was stirred for 5 hours at room temperature. The resulting yellow suspension was diluted with DCM (15 mL) and stirred for 1 hour. The suspension was filtered through syringe filter (0.2 μm PTFE) to remove precipitated LiCl. The filtrate was concentrated in vacuo to obtain a golden syrup. The residue was washed with 1:5 diethyl ether:pentane (v:v, 5 mL×3 times) and pentane (5 mL×3 times). The residue was dried in vacuo to obtain the title compound as a yellow solid. Yield 0.35 g (68%).

Example 4

Homopolymer of HexNB Using Pd601

HexNB (4.5 g, 25 mmol) and BCO (0.022 g, 0.187 mmol) were dissolved in toluene (17 mL). The mixture was purged with nitrogen for one hour and then heated to 80° C. To this stirring solution was added a mixture of palladium compound, Pd601, of Example 1 (0.001 mmol) and LiFABA (0.026 g, 0.003 mmol) in anhydrous THF (0.77 mL) at 80° C. under $N_2$ atmosphere. The reaction mixture was sampled at 30, 60, 120 and 240 min to evaluate molecular weight and conversion by GPC and GC-MS, respectively. The results are summarized in Table 1. The resulting polymer solution was clear.

TABLE 1

| Time (h) | $M_w$ | $M_n$ | PDI | conv. (%) |
|---|---|---|---|---|
| 0.5 | 169,634 | 63,827 | 2.7 | 94.3 |
| 1 | 170,153 | 51,877 | 3.3 | 97.5 |
| 2 | 149,952 | 36,427 | 4.1 | 98.7 |
| 4 | 128,857 | 25,917 | 5 | 99.3 |

Example 5

Homopolymer of HexNB Using Pd1602

The procedure of Example 4 was substantially repeated in this Example 5 except for using palladium compound, Pd1602, of Example 3. The reaction mixture was sampled at 60, 120 and 240 min to evaluate molecular weight and conversion by GPC and GC-MS, respectively. The results are summarized in Table 2. The resulting polymer solution was clear.

TABLE 2

| Time (h) | $M_w$ | $M_n$ | PDI | conv. (%) |
|---|---|---|---|---|
| 1 | 170,811 | 50,026 | 3.4 | 93.8 |
| 2 | 165,327 | 43,639 | 3.8 | 97.4 |
| 3 | 165,144 | 45,418 | 3.6 | 98.5 |

Example 6

Copolymer of NB/HexNB (80/20 Molar Ratio) Using Pd601 with BCO as CTA

NB (1.9 g, 20 mmol), HexNB (0.9 g, 5 mmol), BCO (0.022 g, 0.19 mmol) were dissolved in toluene (10 mL). The mixture was purged with $N_2$ for 1 hour and then warmed up to 80° C. To this stirred solution was added a mixture of Pd601 (0.001 mmol) and LiFABA (0.0261 g, 0.003 mmol) in anhydrous THF (0.8 mL) at 80° C. under $N_2$ atmosphere. The reaction mixture was sampled at 30, 60 and 120 minutes to evaluate molecular weight and conversion by GPC and GC-MS, respectively. The results are summarized in Table 3. The polymer formed was in a clear solution. The results further demonstrate that using Pd601, the palladium compound made in accordance of this invention provides not only high conversions but also polymers of higher molecular weight and of superior optical property.

TABLE 3

| Time (h) | $M_w$ | $M_n$ | PDI | conv. (%) |
|---|---|---|---|---|
| 0.5 | 144,108 | 40,944 | 3.5 | 98.8 |
| 1 | 145,234 | 41,456 | 3.5 | 99.2 |
| 2 | 142,190 | 39,771 | 3.66 | 99.4 |

Example 7

Homopolymer of HexNB Using Pd601 with TES as CTA

HexNB (4.5 g, 25 mmol), TES (0.022 g, 0.19 mmol) and EtOH (0.12 g, 2.5 mmol) were dissolved in toluene (10.4 mL). The mixture was purged with $N_2$ for 1 hour and then warmed up to 80° C. To this stirred solution was added a mixture of Pd601 (0.001 mmol) and LiFABA (0.026 g, 0.003 mmol) in anhydrous THF (0.77 mL) at 80° C. under $N_2$ atmosphere. The reaction mixture was sampled at 30, 120 and 240 minutes to evaluate molecular weight and conversion by GPC and GC-MS, respectively. The results are summarized in Table 4. The polymer formed was in a clear solution. The results further demonstrate that by using Pd601, the palladium compound made in accordance of this invention provides not only high conversions but also polymers of higher molecular weight and of superior optical property.

TABLE 4

| Time (h) | $M_w$ | $M_n$ | PDI | conv. (%) |
|---|---|---|---|---|
| 0.5 | 221,265 | 94,368 | 2.4 | 95.4 |
| 2 | 155,612 | 33,360 | 4.7 | 98.3 |
| 4 | 184,761 | 30,592 | 6 | 98.8 |

Example 8

Copolymer of NB/HexNB (80/20 Molar Ratio) Using Pd601 with TES as CTA

NB (1.9 g, 20 mmol), HexNB (0.9 g, 5 mmol), TES (0.022 g, 0.19 mmol) and EtOH (0.12 g, 2.5 mmol) were dissolved in toluene (10.4 mL). The mixture was purged with $N_2$ for one hour and then warmed to 80° C. To this stirred solution was added a mixture of Pd601 (0.001 mmol) and LiFABA (0.026 g, 0.003 mmol) in anhydrous THF (0.8 mL) at 80° C. under $N_2$ atmosphere. The reaction mixture was sampled at 30, 60, 120 and 240 min to evaluate molecular weight and conversion by GPC and GC-MS, respectively. The results are summarized in Table 5. The polymer formed was in a clear solution. Again, the results demonstrate that by using Pd601, the palladium compound made in accordance of this invention provides not only high conversions of up to 100 percent but also polymers of higher molecular weight and of superior optical property.

TABLE 5

| Time (h) | $M_w$ | $M_n$ | PDI | conv. (%) |
|---|---|---|---|---|
| 0.5 | 104,446 | 27,110 | 3.853 | 98.8 |
| 1 | 103,798 | 23,384 | 4.439 | 99.9 |
| 2 | 103,373 | 24,298 | 4.254 | 99.9 |
| 4 | 102,161 | 21,577 | 4.735 | 100 |

Example 9

Copolymer of NB/HexNB (80/20 Molar Ratio) Using Pd601

In a nitrogen filled glove box, the catalyst solution was prepared by mixing Pd601 (0.0044 g, 0.007 mmol) and LiFABA (0.019 g, 0.022 mmol) in 1:3 molar ratio in a septum bottle. Anhydrous THF (0.87 g) was airlessly transferred to the septum bottle and mixed. NB had previously been dissolved in toluene forming a 75% by weight solution of NB in toluene. The monomers, NB solution (13.7 g or 0.144 mol) and HexNB (6.5 g or 0.036 mol), as well as BCO (0.167 g, 1.54 mol) as CTA, were added to an agitated glass vessel. Toluene (80.2 g) was added to agitated glass vessel to make a 20 wt % solution of the monomers. The glass vessel was purged with nitrogen while being agitated at room temperature. The contents were heated to 80° C. Once at temperature the catalyst & co-catalyst solution was airlessly transferred to the agitated glass vessel. The mixture was stirred for a total of 2 hours. The resulting polymer had an $M_w$ of 154,286 as measured by GPC and conversion of 99.1% as measured by residual monomer using GC-MS.

Example 10

Copolymer of NB/HexNB (80/20 Molar Ratio) Using Pd445

In a nitrogen filled glove box, the catalyst solution was prepared by mixing Pd445 (0.0032 g, 0.007 mmol) and LiFABA (0.019 g, 0.022 mmol) in 1:3 molar ratio in a septum bottle. Anhydrous THF (0.87 g) was airlessly transferred to the septum bottle and mixed. NB had previously been dissolved in toluene forming a 75% by weight solution of NB in toluene. The monomers, NB solution (13.65 g, 0.144 mol) and HexNB (6.46 g, 0.036 mol), as well as BCO (0.167 g or 0.00154 mol) as CTA, were added to an agitated glass vessel. Toluene (80.2 g) was added to agitated glass vessel to make a 20 wt % solution of the monomers. The glass vessel was purged with nitrogen while being agitated at room temperature. The contents were heated to 80° C. Once at temperature the catalyst & co-catalyst solution was airlessly transferred to the agitated glass vessel. The mixture was stirred for a total of 2 hours. The resulting polymer had an $M_w$ of 122,980 as measured by GPC and conversion of 99.5% as measured by residual monomer using GC-MS.

Example 11

Copolymer of NB/HexNB (80/20 Molar Ratio) Using Pd1602

In a nitrogen filled glove box, the catalyst solution was prepared by mixing Pd1602 (0.0116 g, 0.007 mmol) and LiFABA (0.019 g, 0.022 mmol) in 1:3 molar ratio in a septum bottle. Anhydrous THF (0.87 g) was airlessly transferred to the septum bottle and mixed. NB had previously been dissolved in toluene forming a 75% by weight solution of NB in toluene. The monomers, NB solution (13.65 g, 0.144 mol) and HexNB (6.46 g, 0.036 mol), as well as BCO (0.147 g or 1.36 mol) as CTA, were added to an agitated glass vessel. Toluene (91.4 g) was added to agitated glass vessel to make an 18 wt % solution of the monomers. The glass vessel was purged with nitrogen while being agitated at room temperature. The contents were heated to 80° C. Once at temperature the catalyst & co-catalyst solution was airlessly transferred to the agitated glass vessel. The mixture was stirred for a total of 4 hours. The resulting polymer had an $M_w$ of 155,782 as measured by GPC and conversion of 99.6% as measured by residual monomer using GC-MS.

Example 12

Copolymer of NB/HexNB (90/10 Molar Ratio) Using Pd601

The procedure of Example 4 was substantially repeated in this Example 12 except for using a mixture of NB and HexNB in a 90/10 molar ratio. The resulting polymer had an $M_w$ of 69,920 and PDI of 2.8 as measured by HPLC (a mixture of cyclohexane/decalin as solvent and polybutadiene standards) and conversion of 99% as measured by residual monomer using GC-MS.

Examples 13 and 14

Copolymer of NB/HexNB (95/5 Molar Ratio)

The procedure of Example 7 was substantially repeated in Example 13 except for using a mixture of NB and HexNB in a 95/5 molar ratio. In Example 14, Pd1602, a palladium compound of Example 3 was used instead of Pd601 of Example 1 to form a copolymer of NB/HexNB of 95/5 molar ratio. The $M_w$ and PDI of resulting polymers and conversion are summarized in Table 6. The $M_w$ and the PDI were measured by HPLC using a mixture of cyclohexane/decalin as solvent and polybutadiene standards and the conversion was measured by residual monomer using GC-MS.

TABLE 6

| Example No. | $M_w$ | PDI | Conv. (%) |
|---|---|---|---|
| Example 13 | 88,645 | 4.1 | 99.5 |
| Example 14 | 86,493 | 3 | 99.7 |

Example 15

Film Formation from Copolymer of NB/HexNB (90/10 Molar Ratio) Made with Pd601

Previously precipitated copolymer from Example 12 was dissolved in toluene to form a 20 wt % solution of the polymer. Utilizing a bar coater a 50 μm thick wet film was produced. The solvent was evaporated using a two-step drying process. The wet film was first heated to 80° C. for 5 minutes followed by 110° C. for 10 minutes. Following drying the tensile modulus, elongation to break (ETB) and CTE were measured: tensile modulus 2192 MPa; ETB −4.6% and CTE 80 ppm.

Example 16

Film Formation from Copolymers of NB/HexNB

Various polymers formed respectively from Examples 9, 11, 13 and 14 were dissolved in toluene to from solutions having about 18 weight percent polymer. Each of these polymer solutions were then fabricated into films using solvent casting process. The films thus formed were dried at 250° C. for 3 hours in vacuum. The thermo-mechanical properties were measured as summarized in Table 7. The glass transition temperature ($T_g$) was measured using DMA Q800 (TA Instruments Inc., TX, USA) in a multi-frequency-strain temperature ramp mode at a rate of 5° C./min from 30 to 320° C. with 1 Hz frequency, 0.1% strain, and 0.001 N preload force under a nitrogen atmosphere. The length and width of the specimen were 35 and 8 mm, respectively, and the thickness of the rectangular film was 0.1 mm. The coefficient of thermal expansion (CTE) was measured using Olympus OLS4000 Laser Microscope equipped with a Linkam Hotstage at a temperature ramp of 10° C./min stepwise with 5° C. increments from 50 to 150° C. Strains $\varepsilon_{xx}$ and $\varepsilon_{yy}$ were calculated by the digital image correlation method (DICM). The dielectric constant (Dk) and dielectric loss (Df) measurements were made using the copolymer (NB/HexNB) films cut into the size of about 3.5 mm width and 80 mm length using a dicing saw. The diced films were dried at 100° C. for 3 hours in vacuum. The relative dielectric constant (Dk) and dielectric loss tangent (Df) of the films were measured using a resonant cavity microwave dielectric constant meter (ADMS010c, JIS C2565) at 10 GHz. The elongation to break (ETB) was calculated from the stress strain curve generated using a film stack of 30 mm width×60 mm length×0.1 mm thickness using Shimadzu AG-500kNIS, the distance between chucks was 30 mm and the tensile speed was 1 mm/min. The tensile testing was done using Instron in accordance with testing protocol as set forth in ASTM D638. It is evident from the data presented in Table 7 both of the palladium compounds of this invention, specifically compounds of Example 1 and Example 3 respectively, are similarly active in forming films exhibiting superior properties. It should further be noted that the observed thermo-mechanical properties as summarized in Table 7 are unattainable from any of the other palladium catalysts known in the art.

TABLE 7

| | Polymer Ex # | | | |
|---|---|---|---|---|
| | Example 9 | Example 11 | Example 13 | Example 14 |
| NB/HexNB | 80:20 | 80:20 | 95:5 | 95:5 |
| Catalyst | Pd601 (Ex. 1) | Pd1602 (Ex. 3) | Pd601 (Ex. 1) | Pd1602 (Ex. 3) |
| Film Thickness | 97 μm | 101 μm | 95 μm | 98 μm |
| $T_g$ (° C.) | 294 | 289 | 310 | 304 |
| CTE (pp/K) | 70 | 70 | 50 | 50 |
| Dk (10 GHz) | 2.1 | 2.2 | 2.1 | 2.2 |
| Df (10 GHz) | $4 \times 10^{-4}$ | $8.4 \times 10^{-4}$ | $4.4 \times 10^{-4}$ | $9.5 \times 10^{-4}$ |
| Storage Modulus (GPa) | 1.8 | 1.4 | 1.8 | 1.7 |
| Elongation (%) | 14 | 9 | 9 | 7 |
| Tensile Strength (MPa) | 60 | 60 | 44 | 54 |
| Elongation (%) | 20 | 16 | 6 | 4 |
| Tensile Modulus (GPa) | 1.4 | 1.4 | 1.7 | 1.8 |

Comparative Example 1

$Pd(OAc)_2(PAd_2\text{-n-Bu})_2$ (Pd942)

Palladium acetate (0.1 g, 0.445 mmol) was placed in Schlenk flask purged with nitrogen. It was then dissolved in anhydrous toluene (3 mL), and the mixture was cooled to −78° C. (dry ice IPA bath). n-Butyldi-1-adamantylphosphine (0.327 g, 0.913 mmol) was dissolved in anhydrous toluene (2 mL) under $N_2$ atmosphere. To the stirred palladium acetate solution was added the phosphine solution dropwise under $N_2$ atmosphere at −78° C. The mixture was stirred for additional 15 minutes at −78° C. Then, the mixture was allowed to warm up to ambient temperature and stirred overnight. The yellow solution turned into yellow suspension. The suspension was diluted with anhydrous pentane (5 mL), and the precipitate was collected by filtration. The obtained solid was washed with pentane (5 mL×3), and resulting yellow solid was dried in vacuum. Yield 0.25 g (60%). $^1$H NMR ($CDCl_3$, 500 MHz): δ 1.02 (t, 6H), 1.38 (q, 4H), 1.54 (q, 4H), 1.75-1.78 (m, 12H), 1.88 (m, 22H), 2.06 (m, 12H), 2.31 (m, 12H), 2.43 (m, 12H), $^{31}$P NMR ($CDCl_3$, 202 MHz): d 26.8.

Comparative Example 2

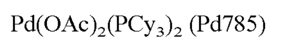
$Pd(OAc)_2(PCy_3)_2$ (Pd785)

The procedure as set forth in Comparative Example 1 was substantially followed in this Comparative Example 2 except for using tri-cyclohexylphosphine in place of n-butyldi-1-adamantylphosphine to obtain the title compound.

The following Comparative Examples 3 and 4 illustrate that the palladium compounds known in the art, i.e., of Comparative Examples 1 and 2 do not provide the polymers of superior quality as illustrated in Examples 4 and 5. That is, the palladium compounds according to the present invention provide polymers of superior properties. Specifically, Comparative Example 3 illustrates that the polymer made using Pd942, Comparative Example 1, is of lower conversion and of varied polydispersity as summarized in Table 8. The polymer made using Pd785, Comparative Example 2, provides hazy polymer solution even at 30 minutes and is of lower molecular weight as summarized in Table 9.

Comparative Example 3

Homopolymer of HexNB Using Pd942

The procedure of Example 4 was substantially repeated in this Comparative Example 3 except for using palladium compound, Pd942, of Comparative Example 1. The reaction mixture was sampled at 30, 60, 120 and 240 min to evaluate molecular weight and conversion by GPC and GC-MS, respectively. The results are summarized in Table 8. Even though the resulting polymer solution was clear the conversions were generally low even after 4 hours as summarized in Table 8.

TABLE 8

| Time (h) | $M_w$ | $M_n$ | PDI | conv. (%) |
|---|---|---|---|---|
| 0.5 | 166,704 | 63,259 | 2.6 | 84.5 |
| 1 | 128,584 | 40,632 | 3.2 | 92.5 |
| 2 | 117,959 | 23,912 | 4.9 | 96.8 |
| 4 | 135,640 | 24,295 | 5.6 | 98.4 |

Comparative Example 4

Homopolymer of HexNB Using Pd785

The procedure of Example 4 was substantially repeated in this Comparative Example 4 except for using palladium compound, Pd785, of Comparative Example 2. The reaction mixture was sampled at 60, 120 and 240 min to evaluate molecular weight and conversion by GPC and GC-MS, respectively. The results are summarized in Table 9. The resulting polymer solution was hazy even at 30 minutes of polymerization even though the conversion seemed to be around 99.8 percent or higher as summarized in Table 9.

TABLE 9

| Time (h) | $M_w$ | $M_n$ | PDI | conv. (%) |
|---|---|---|---|---|
| 1 | 144,514 | 39,607 | 3.7 | 99.8 |
| 2 | n.m. | n.m. | n.m. | 99.8 |
| 4 | 145,206 | 40,162 | 3.6 | 99.9 |

n.m.—not measured

Comparative Example 5

Homopolymer of NB Using Pd942 With TES/EtOH as CTA

The procedure of Example 7 was substantially repeated in this Comparative Example 5 except for using palladium compound, Pd942, of Comparative Example 1. The reaction mixture was sampled at 30, 60, 120 and 240 min to evaluate molecular weight and conversion by GPC and GC-MS, respectively. The reaction mixture remained liquid even after 4 hours and viscosity of the reaction mixture did not change much. The conversion at 2 hours was determined to be only about 30 percent; the resulting polymer had an $M_w$ of 293,186, $M_n$ of 142,545, PDI was 2.1 as measured by GPC.

Comparative Example 6

Copolymer of NB/HexNB (80/20 Molar Ratio) Using Pd942 with TES/EtOH as CTA

The procedure of Example 8 was substantially repeated in this Comparative Example 6 except for using palladium compound, Pd942, of Comparative Example 1. The reaction mixture was sampled at 30, 60, 120 and 240 min to evaluate molecular weight and conversion by GPC and GC-MS, respectively. The reaction mixture remained liquid even after 4 hours and viscosity of the reaction mixture did not change much indicating that Pd942 is ineffective as a vinyl addition polymerization catalyst under these conditions. No polymerization of the monomers had taken place even after 4 hours.

Comparative Example 7

Copolymer of NB/HexNB (80/20 Molar Ratio) Using Pd613

In a nitrogen filled glove box, the catalyst solution was prepared by mixing Pd613 (0.0044 g, 0.007 mmol) and LiFABA (0.019 g, 0.022 mmol) in 1:3 molar ratio in a septum bottle. Anhydrous THF (0.87 g) was airlessly transferred to the septum bottle and mixed. NB had previously been dissolved in toluene forming a 75% by weight solution of NB in toluene. The monomers, NB solution (13.65 g, 0.145 mol) and HexNB (6.46 g, 0.036 mol), as well as BCO (0.167 g, 1.54 mmol) as CTA, were added to an agitated glass vessel. Toluene (80.2 g) was added to agitated glass vessel to make a 20 wt % solution of the monomers. The glass vessel was purged with nitrogen while being agitated at room temperature. The contents were heated to 80° C. Once at temperature the catalyst & co-catalyst solution was airlessly transferred to the agitated glass vessel. The mixture was stirred for a total of 2 hours. The resulting polymer had an $M_w$ of 70,647 as measured by GPC and conversion of 74% as measured by residual monomer using GC-MS.

This Comparative Example 7 clearly demonstrates that a commonly used palladium catalysts of prior art such as N-heterocyclic carbene (NHC) bound palladium compounds are not as effective in the vinyl additional polymerization of olefinic monomers of formula (IV) as described herein. For example, Pd613 which is a NHC ligated palladium catalyst as used in this Comparative Example 7 results in not only low conversions of only 74% but also a polymer of lower molecular weight of 70,647 under similar reaction conditions as employed in Examples 4 to 14 in accordance with the practice of this invention.

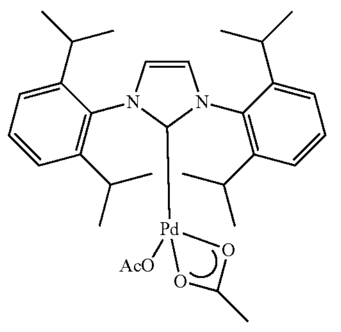

Pd613—N,N-bis(2,6-diisopropylphenyl)-imidazol-2-ylidene $Pd(OAc)_2$

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. A palladium compound of formula (I):

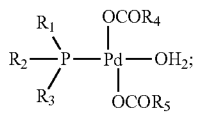

(I)

wherein at least two of $R_1$, $R_2$ and $R_3$ are the same and are selected from the group consisting of tert-($C_4$-$C_{12}$)alkyl, 1-($C_1$-$C_5$)alkyl($C_3$-$C_5$) cycloalkyl, 1-($C_5$-$C_{12}$) bicycloalkyl, 1-($C_8$-$C_{12}$) tricycloalkyl, ($C_6$-$C_{10}$) aryl and ($C_6$-$C_{10}$) aryl($C_1$-$C_3$)alkyl;

and the remaining $R_1$, $R_2$ or $R_3$ is methyl, ethyl, linear or branched ($C_3$-$C_{12}$)alkyl, ($C_6$-$C_{10}$) aryl or ($C_6$-$C_{10}$) aryl ($C_1$-$C_3$)alkyl; and $R_4$ and $R_5$ are the same or different and each independently selected from the group consisting of methyl, ethyl, linear or branched ($C_3$-$C_{20}$)alkyl, trifluoromethyl, pentafluoroethyl and linear or branched ($C_3$-$C_{20}$) perfluoroalkyl.

2. The palladium compound of formula (I) according to claim 1, wherein:

at least two of $R_1$, $R_2$ and $R_3$ are the same and are selected from the group consisting of tert-butyl, tert-pentyl, tert-hexyl, tert-heptyl 1-methylcyclopentyl, 1-methylcyclohexyl, 1-methylcycloheptyl, 1-bicyclo[2.2.1]heptyl, 1-bicyclo[2.2.1]octyl and 1-adamantyl;

and the remaining $R_1$, $R_2$ or $R_3$ is selected from methyl, ethyl, n-propyl, isopropyl, n-butyl, isobutyl, n-pentyl, 3-methylbutyl (isoamyl) or 2,2-dimethylpropyl (neopentyl); and $R_4$ and $R_5$ are the same or different and each independently selected from the group consisting of methyl, ethyl, n-propyl, isopropyl, n-butyl, isobutyl, trifluoromethyl, pentafluoroethyl and heptafluoropropyl.

3. The palladium compound of formula (I) according to claim 1, which is selected from the group consisting of:

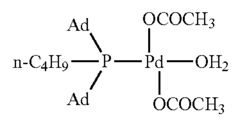

n-butyldi-1-adamantylphosphine palladium diacetate ($H_2O$) (Pd601);

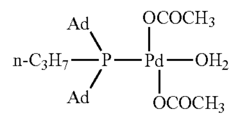

n-propyldi-1-adamantylphosphine palladium diacetate ($H_2O$);

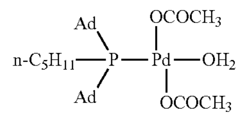

n-pentyldi-1-adamantylphosphine palladium diacetate ($H_2O$);

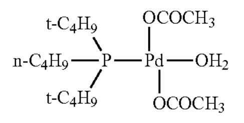

n-butyldi-tert-butylphosphine palladium diacetate ($H_2O$) (Pd445);

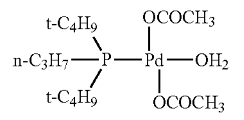

n-propyldi-tert-butylphosphine palladium diacetate ($H_2O$);

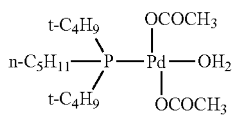

n-pentyldi-tert-butylphosphine palladium diacetate ($H_2O$);

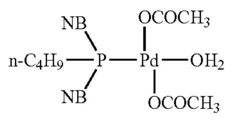

n-butyldi-1-norbornanylphosphine palladium diacetate ($H_2O$); and

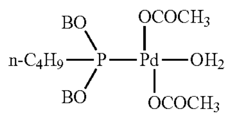

n-butyldi-1-bicyclo[2.2.2]octylphosphine palladium diacetate ($H_2O$).

4. A vinyl addition polymerization catalyst comprising a palladium compound of formula (I) according to claim 1.

5. A palladium compound of formula (II):

(II)

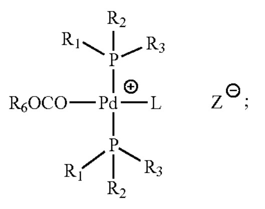

wherein

L is selected from the group consisting of acetonitrile, propionitrile, n-butyronitrile, tert-butyronitrile, benzonitrile ($C_6H_5CN$), 2,4,6-trimethylbenzonitrile, phenyl acetonitrile ($C_6H_5CH_2CN$), pyridine, 2-methylpyridine, 3-methylpyridine, 4-methylpyridine, 2,3-dimethylpyridine, 2,4-dimethylpyridine, 2,5-dimethylpyridine, 2,6-dimethylpyridine, 3,4-dimethylpyridine, 3,5-dimethylpyridine, 2,6-di-t-butylpyridine, 2,4-di-t-butylpyridine, 2-methoxypyridine, 3-methoxypyridine, 4-methoxypyridine, pyrazine, 2,3,5,6-tetramethylpyrazine, diethyl ether, di-n-butyl ether, dibenzyl ether, tetrahydrofuran, tetrahydropyran and benzophenone;

$Z^{\ominus}$ is selected from the group consisting of $BF_4^{\ominus}$, tetrakis (pentafluorophenyl) borate, tetrakis(3,5-bis(trifluoromethyl) phenyl) borate, tetrakis(2-fluorophenyl) borate, tetrakis(3-fluorophenyl) borate, tetrakis(4-fluorophenyl) borate, tetrakis(3,5-difluorophenyl) borate, tetrakis (2,3,4,5-tetrafluorophenyl) borate, tetrakis(3,4,5,6-tetrafluorophenyl) borate, tetrakis(3,4,5-trifluorophenyl) borate, methyltris(perfluorophenyl) borate, ethyltris (perfluorophenyl) borate, phenyltris(perfluorophenyl) borate, tetrakis(1,2,2-trifluoroethylenyl) borate, tetrakis (4-tri-1-propylsilyltetrafluorophenyl) borate, tetrakis (4-dimethyl-tert-butylsilyltetrafluorophenyl) borate, (triphenylsiloxy) tris(pentafluorophenyl) borate, (octyloxy) tris(pentafluorophenyl) borate, tetrakis[3,5-bis[1-methoxy-2,2,2-trifluoro-1-(trifluoromethyl) ethyl]phenyl]borate, tetrakis[3-[1-methoxy-2, 2,2-trifluoro-1-(trifluoromethyl) ethyl]-5-(trifluoromethyl) phenyl] borate, and tetrakis[3-[2,2,2-trifluoro-1-(2,2,2-trifluoroethoxy)-1-(trifluoromethyl)-ethyl]-5-(trifluoromethyl) phenyl]borate, $PF_6^{\ominus}$, $SbF_6^{\ominus}$, $n\text{-}C_4F_9SO_3^{\ominus}$, $CF_3SO_3^{\ominus}$ and $p\text{-}CH_3(C_6H_4)\text{—}SO_3^{\ominus}$, at least two of $R_1$, $R_2$ and $R_3$ are the same and are selected from the group consisting of 1-($C_1$-$C_5$)alkyl($C_3$-$C_8$) cycloalkyl, 1-($C_5$-$C_{12}$) bicycloalkyl, 1-($C_8$-$C_{12}$) tricycloalkyl, and ($C_6$-$C_{10}$) aryl($C_1$-$C_3$)alkyl; and the remaining $R_1$, $R_2$ or $R_3$ is methyl, ethyl, linear ($C_3$-$C_{12}$) alkyl, ($C_6$-$C_{10}$) aryl or ($C_6$-$C_{10}$) aryl($C_1$-$C_3$)alkyl; and $R_6$ is selected from the group consisting of methyl, ethyl, linear or branched ($C_3$-$C_{20}$)alkyl, trifluoromethyl, pentafluoroethyl and linear or branched ($C_3$-$C_{20}$) perfluoroalkyl.

6. The palladium compound of formula (II) according to claim 5, which is selected from the group consisting of:

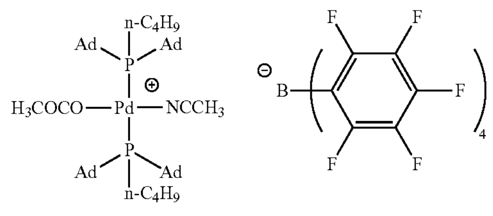

bis(n-butyldi-1-adamantylphosphine) palladium acetate (acetonitrile) tetrakis(pentafluorophenyl) borate;

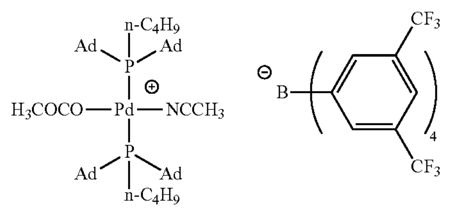

bis(n-butyldi-1-adamantylphosphine) palladium acetate (acetonitrile) tetrakis(3,5-bis(trifluoromethyl) phenyl) borate; and

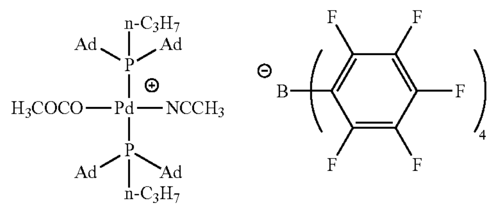

bis(n-propyldi-1-adamantylphosphine) palladium acetate (acetonitrile) tetrakis(pentafluorophenyl) borate.

7. A vinyl addition polymerization catalyst comprising a palladium compound of formula (II) according to claim 5.

8. A polymerization composition comprising:

a) a palladium compound selected from the group consisting of:

a compound of formula (I):

(I)

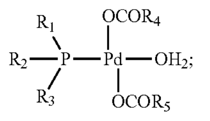

and a compound of formula (II):

(II)

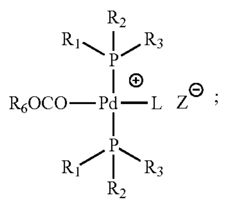

wherein

L is selected from the group consisting of acetonitrile, propionitrile, n-butyronitrile, tert-butyronitrile, benzonitrile ($C_6H_5CN$), 2,4,6-trimethylbenzonitrile, phenyl acetonitrile ($C_6H_5CH_2CN$), pyridine, 2-methylpyridine, 3-methylpyridine, 4-methylpyridine, 2,3-dimethylpyridine, 2,4-dimethylpyridine, 2,5-dimethylpyridine, 2,6-dimethylpyridine, 3,4-dimethylpyridine, 3,5-dimethylpyridine, 2,6-di-t-butylpyridine, 2,4-di-t-butylpyridine, 2-methoxypyridine, 3-methoxypyridine, 4-methoxypyridine, pyrazine, 2,3,5,6-tetramethylpyrazine, diethyl ether, di-n-butyl ether, dibenzyl ether, tetrahydrofuran, tetrahydropyran and benzophenone;

$Z^{\ominus}$ is selected from the group consisting of $BF_4^{\ominus}$, tetrakis (pentafluorophenyl) borate, tetrakis(3,5-bis(trifluoromethyl) phenyl) borate, tetrakis(2-fluorophenyl) borate, tetrakis(3-fluorophenyl) borate, tetrakis(4-fluorophenyl) borate, tetrakis(3,5-difluorophenyl) borate, tetrakis (2,3,4,5-tetrafluorophenyl) borate, tetrakis(3,4,5,6-tetrafluorophenyl) borate, tetrakis(3,4,5-trifluorophenyl) borate, methyltris(perfluorophenyl) borate, ethyltris (perfluorophenyl) borate, phenyltris(perfluorophenyl) borate, tetrakis(1,2,2-trifluoroethylenyl)borate, tetrakis (4-tri-1-propylsilyltetrafluorophenyl)borate, tetrakis(4-dimethyl-tert-butylsilyltetrafluorophenyl)borate, (triphenylsiloxy)tris(pentafluorophenyl) borate, (octyloxy) tris(pentafluorophenyl) borate, tetrakis[3,5-bis[1-methoxy-2,2,2-trifluoro-1-(trifluoromethyl) ethyl]phenyl]borate, tetrakis[3-[1-methoxy-2,2,2-trifluoro-1-(trifluoromethyl) ethyl]-5-(trifluoromethyl) phenyl]borate, and tetrakis[3-[2,2,2-trifluoro-1-(2,2,2-trifluoroethoxy)-1-(trifluoromethyl)-ethyl]-5-(trifluoromethyl) phenyl]borate, $PF_6^{\ominus}$, $SbF_6^{\ominus}$, n-$C_4F_9SO_3^{\ominus}$, $CF_3SO_3^{\ominus}$ and p-$CH_3(C_6H_4)$—$SO_3^{\ominus}$;

at least two of $R_1$, $R_2$ and $R_3$ are the same and is are selected from the group consisting of tert-($C_4$-$C_{12}$) alkyl, 1-($C_1$-$C_5$)alkyl($C_3$-$C_8$) cycloalkyl, 1-($C_5$-$C_{12}$) bicycloalkyl, 1-($C_8$-$C_{12}$) tricycloalkyl, ($C_6$-$C_{10}$) aryl and ($C_6$-$C_{10}$) aryl($C_1$-$C_3$)alkyl;

and the remaining $R_1$, $R_2$ or $R_3$ is methyl, ethyl, linear or branched ($C_3$-$C_{12}$)alkyl, ($C_6$-$C_{10}$) aryl or ($C_6$-$C_{10}$) aryl ($C_1$-$C_3$)alkyl; and $R_4$, $R_5$ and $R_6$ are the same or different and each independently selected from the group consisting of methyl, ethyl, linear or branched ($C_3$-$C_{20}$)alkyl, trifluoromethyl, pentafluoroethyl and linear or branched ($C_3$-$C_{20}$) perfluoroalkyl;

b) a compound of formula (III):

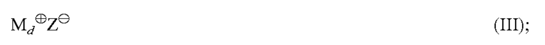

$M_d^{\oplus}Z^{\ominus}$ (III);

wherein $M_d^{\oplus}$ is a cation selected from lithium, sodium, potassium, cesium, ammonium, dialkylanilinium or linear or branched tetra($C_1$-$C_4$)alkyl ammonium;

$Z^{\ominus}$ is a weakly coordinating anion selected from the group consisting of $B(C_6F_5)_4^{\ominus}$, $B[C_6H_3(CF_3)_2]_4^{\ominus}$, $B(C_6H_5)_4^{\ominus}$, $[Al(OC(CF_3)_2C_6F_5)_4]^{\ominus}$, $BF_4^{\ominus}$, $PF_6^{\ominus}$, $AsF_6^{\ominus}$, $SbF_6^{\ominus}$, $(CF_3SO_2)N^{\ominus}$ or $CF_3SO_3^{\ominus}$; and c) at least one monomer of formula (IV):

(IV)

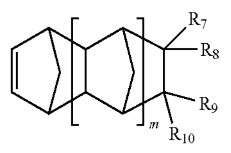

wherein:

m is an integer 0, 1 or 2;

$R_7$, $R_8$, $R_9$ and Rio are the same or different and each independently of one another is selected from hydrogen, linear or branched ($C_1$-$C_{16}$)alkyl, hydroxy ($C_1$-$C_{16}$)alkyl, perfluoro ($C_1$-$C_{12}$)alkyl, ($C_3$-$C_{12}$) cycloalkyl, ($C_6$-$C_{12}$) bicycloalkyl, ($C_7$-$C_{14}$) tricycloalkyl, ($C_6$-$C_{10}$) aryl, ($C_6$-$C_{10}$) aryl($C_1$-$C_3$)alkyl, perfluoro ($C_6$-$C_{10}$) aryl, perfluoro ($C_6$-$C_{10}$) aryl($C_1$-$C_3$)alkyl, di($C_1$-$C_2$)alkylmaleimide ($C_3$-$C_6$)alkyl, di($C_1$-$C_2$) alkylmaleimide ($C_2$-$C_6$)alkoxy ($C_1$-$C_2$)alkyl, hydroxy, ($C_1$-$C_{12}$)alkoxy, ($C_3$-$C_{12}$) cycloalkoxy, ($C_6$-$C_{12}$) bicycloalkoxy, ($C_7$-$C_{14}$) tricycloalkoxy, ($C_6$-$C_{10}$) aryloxy ($C_1$-$C_3$)alkyl, ($C_5$-$C_{10}$) heteroaryloxy ($C_1$-$C_3$)alkyl, ($C_6$-$C_{10}$) aryloxy, ($C_5$-$C_{10}$) heteroaryloxy or ($C_1$-$C_6$) acyloxy, where each of the aforementioned substituents is optionally substituted with halogen or hydroxy.

9. The polymerization composition according to claim 8 further comprising a solvent.

10. The polymerization composition according to claim 9, wherein the solvent is selected from the group consisting of methanol, ethanol, n-propanol, isopropanol, n-butanol, isobutanol, tert-butanol, pentane, hexane, heptane, octane, decane, cyclohexane, dichloromethane, chloroform, carbon tetrachloride, chloroethane, 1,1-dichloroethane, 1,2-dichloroethane, 1-chloropropane, 2-chloropropane, 1-chlorobutane, 2-chlorobutane, 1-chloro-2-methylpropane, 1-chloropentane, benzene, toluene, o-, m-, or p-xylenes, mesitylene, chlorobenzene, o-dichlorobenzene, tetrahydrofuran (THF), diethylether, petroleum ether and mixtures thereof.

11. The polymerization composition according to claim 8, wherein the compound of formula (I) is selected from the group consisting of:

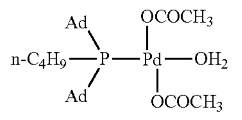

n-butyldi-1-adamantylphosphine palladium diacetate ($H_2O$) (Pd601);

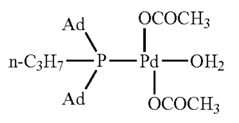

n-propyldi-1-adamantylphosphine palladium diacetate ($H_2O$);

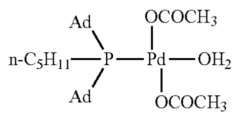

n-pentyldi-1-adamantylphosphine palladium diacetate ($H_2O$);

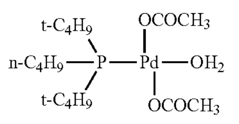

n-butyldi-tert-butylphosphine palladium diacetate ($H_2O$) (Pd445);

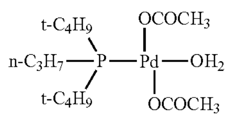

n-propyldi-tert-butylphosphine palladium diacetate ($H_2O$);

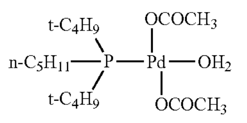

n-pentyldi-tert-butylphosphine palladium diacetate ($H_2O$);

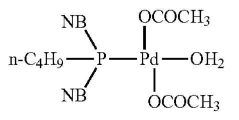

n-butyldi-1-norbornanylphosphine palladium diacetate ($H_2O$); and

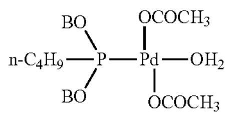

n-butyldi-1-bicyclo[2,2,2]octylphosphine palladium diacetate ($H_2O$).

12. The polymerization composition according to claim 8, wherein the compound of formula (II) is selected from the group consisting of:

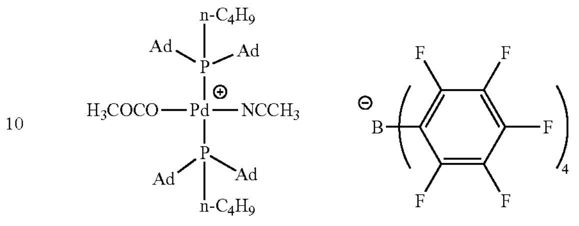

bis(n-butyldi-1-adamantylphosphine) palladium acetate (acetonitrile) tetrakis(pentafluorophenyl) borate;

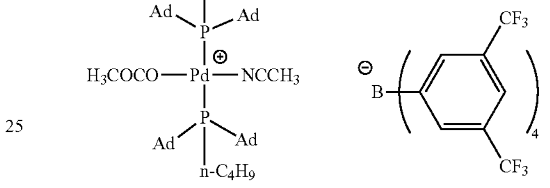

bis(n-butyldi-1-adamantylphosphine) palladium acetate (acetonitrile) tetrakis(3,5-bis(trifluoromethyl) phenyl) borate; and

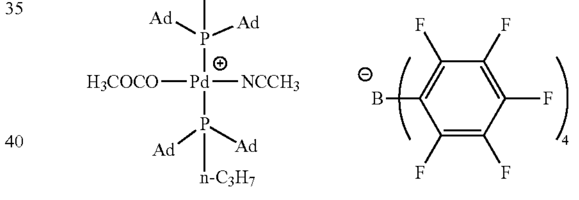

bis(n-propyldi-1-adamantylphosphine) palladium acetate (acetonitrile) tetrakis(pentafluorophenyl)borate.

13. The polymerization composition according to claim 8, wherein the compound of formula (III) is selected from the group consisting of:

lithium tetrafluoroborate;
lithium triflate;
lithium tetrakis(pentafluorophenyl) borate;
lithium tetraphenylborate;
lithium tetrakis(3,5-bis(trifluoromethyl) phenyl) borate;
lithium hexafluorophosphate;
lithium hexafluoroarsenate;
lithium hexafluoroantimonate; and
N,N-dimethylaniliniumtetrakis(pentafluorophenyl)-borate (DANFABA).

14. The polymerization composition according to claim 8, wherein the monomer of formula (IV) is selected from the group consisting of:

bicyclo[2.2.1]hept-2-ene (NB);
5-hexylbicyclo-[2.2.1]hept-2-ene (HexNB);
5-octylbicyclo[2.2.1]hept-2-ene (OctNB);
5-decylbicyclo[2.2.1]hept-2-ene (DecNB);
5-perfluorobutylbicyclo[2.2.1]hept-2-ene ($C_4F_9NB$);

5-phenethylbicyclo[2.2.1]hept-2-ene (PENB);
5-benzylbicyclo[2.2.1]hept-2-ene (BnNB); and
2-(bicyclo[2.2.1]hept-5-en-2-yl) bicyclo[2.2.1]heptane (NBANB).

* * * * *